(12) United States Patent
Delise et al.

(10) Patent No.: US 11,564,852 B2
(45) Date of Patent: Jan. 31, 2023

(54) MOBILE HYPERBARIC UNIT

(71) Applicants: Christian Delise, New Orleans, LA (US); Bobby Delise, New Orleans, LA (US)

(72) Inventors: Christian Delise, New Orleans, LA (US); Bobby Delise, New Orleans, LA (US)

( * ) Notice: Subject to any disclaimer, the term of this patent is extended or adjusted under 35 U.S.C. 154(b) by 348 days.

(21) Appl. No.: 15/812,181

(22) Filed: Nov. 14, 2017

(65) Prior Publication Data

US 2018/0133074 A1    May 17, 2018

Related U.S. Application Data

(60) Provisional application No. 62/421,955, filed on Nov. 14, 2016.

(51) Int. Cl.
*A61G 3/00* (2006.01)
*A61G 3/06* (2006.01)
(Continued)

(52) U.S. Cl.
CPC ............ *A61G 3/001* (2013.01); *A61G 3/063* (2013.01); *A61G 10/026* (2013.01); *B60P 1/52* (2013.01); *B62D 33/02* (2013.01)

(58) Field of Classification Search
CPC ........ A61G 10/00; A61G 10/02; A61G 10/04; A61G 10/026; A61G 10/023; A61G 3/001;
(Continued)

(56) References Cited

U.S. PATENT DOCUMENTS 3,500,648 A * 3/1970 Daniell .................... B63G 8/22
                                                                                  405/192
3,587,574 A * 6/1971 Mercer ................ A61G 10/026
                                                                                  128/205.26
(Continued)

FOREIGN PATENT DOCUMENTS

DE    4114177 A1 * 11/1991  ............ A61G 3/001
FR    2570657        3/1986
(Continued)

OTHER PUBLICATIONS

PCT International Search Report and Written Opinion of the International Searching Authority dated Mar. 29, 2018 PCT/US2017/061480; Filed Nov. 14, 2017.

*Primary Examiner* — Tu A Vo
*Assistant Examiner* — Kelsey E Baller
(74) *Attorney, Agent, or Firm* — Garvey, Smith & Nehrbass, Patent Attorneys, L.L.C.; Vanessa M. D'Souza; Charles C. Garvey, Jr.

(57) ABSTRACT

The present invention is a mobile hyperbaric unit including a vehicle having a vehicle chassis with a front cabin and a rear bed. A partition can extend upwardly from the rear bed at a position next to the cabin. A pod can be removably attachable to the vehicle chassis, the pod can be sized and shaped to occupy and rest upon the rear bed. A detachable connection can enable attachment or detachment of the pod from the vehicle chassis. The partition can have a portion that extends at least partially over the pod top wall. A pod chassis enables the pod to be transported independently of the vehicle chassis. A control station that has ambient pressure can be located in between the partition and the pod. A desired pressure that is not ambient pressure can be maintained within the pod interior by support systems on the vehicle.

20 Claims, 15 Drawing Sheets

(51) Int. Cl.
*A61G 10/02* (2006.01)
*B60P 1/52* (2006.01)
*B62D 33/02* (2006.01)

(58) Field of Classification Search
CPC .......... A61G 3/00; A61G 3/063; A61G 3/003; A61G 3/0128; A61G 3/062; B62D 63/025; B60P 3/14; B60P 1/52; B60P 33/02
USPC ............. 296/24.32, 24.38, 19, 20, 164, 167; 128/205.26; 414/498
See application file for complete search history.

(56) References Cited

U.S. PATENT DOCUMENTS

| | | | |
|---|---|---|---|
| 4,227,524 A * | 10/1980 | Galerne | B63C 11/325 128/205.26 |
| 4,467,798 A * | 8/1984 | Saxon | B63C 11/325 128/202.12 |
| 5,593,272 A * | 1/1997 | Green | B60P 1/04 296/164 |
| 5,626,151 A | 5/1997 | Linden | |
| 5,685,293 A * | 11/1997 | Watt | A61G 10/026 128/202.12 |
| 5,964,065 A * | 10/1999 | Migurski | E04H 3/08 52/64 |
| 6,062,215 A | 5/2000 | Leininger et al. | |
| 6,461,290 B1 | 10/2002 | Reichman et al. | |
| 6,488,029 B1 | 12/2002 | Hood et al. | |
| 6,497,231 B1 | 12/2002 | White | |
| 6,668,950 B2 * | 12/2003 | Park | B60B 19/003 180/7.1 |
| 6,899,103 B1 | 5/2005 | Hood et al. | |
| 9,138,366 B2 | 9/2015 | Radko | |
| 9,186,232 B1 * | 11/2015 | Otto | A61D 7/00 |
| 2008/0210234 A1 * | 9/2008 | O'Brien | A61G 10/026 128/202.12 |
| 2009/0250063 A1 | 10/2009 | Gaumond et al. | |
| 2013/0047988 A1 | 2/2013 | Delp, II et al. | |

FOREIGN PATENT DOCUMENTS

| | | | |
|---|---|---|---|
| RU | 2023441 C1 * | 11/1994 | |
| WO | WO2006053395 | 5/2006 | |
| WO | WO-2007012710 A1 * | 2/2007 | ......... B62D 25/2054 |

\* cited by examiner

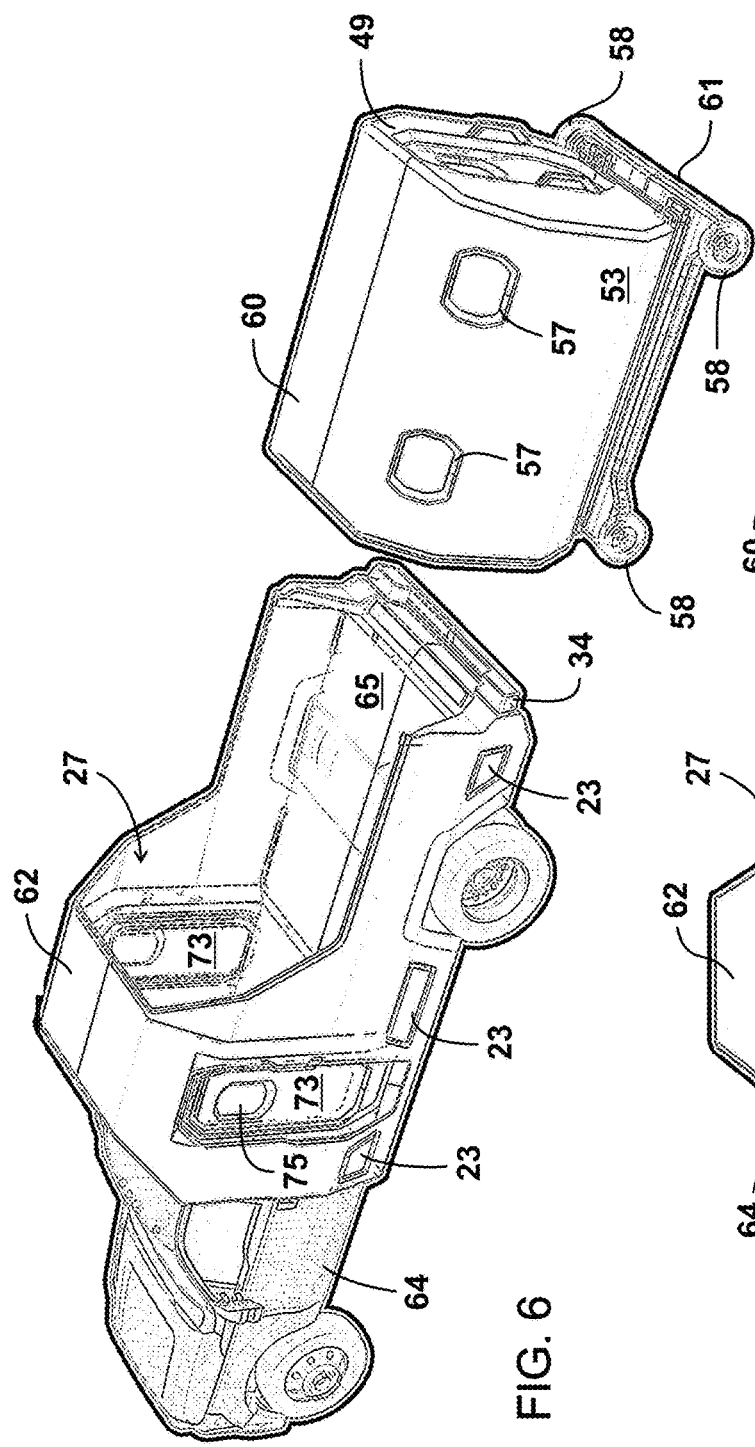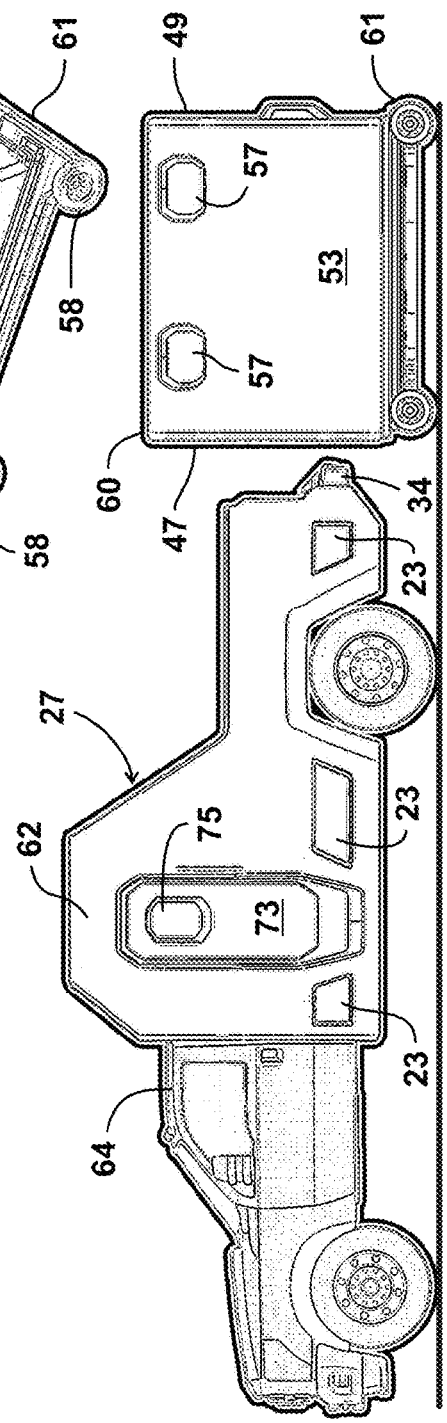

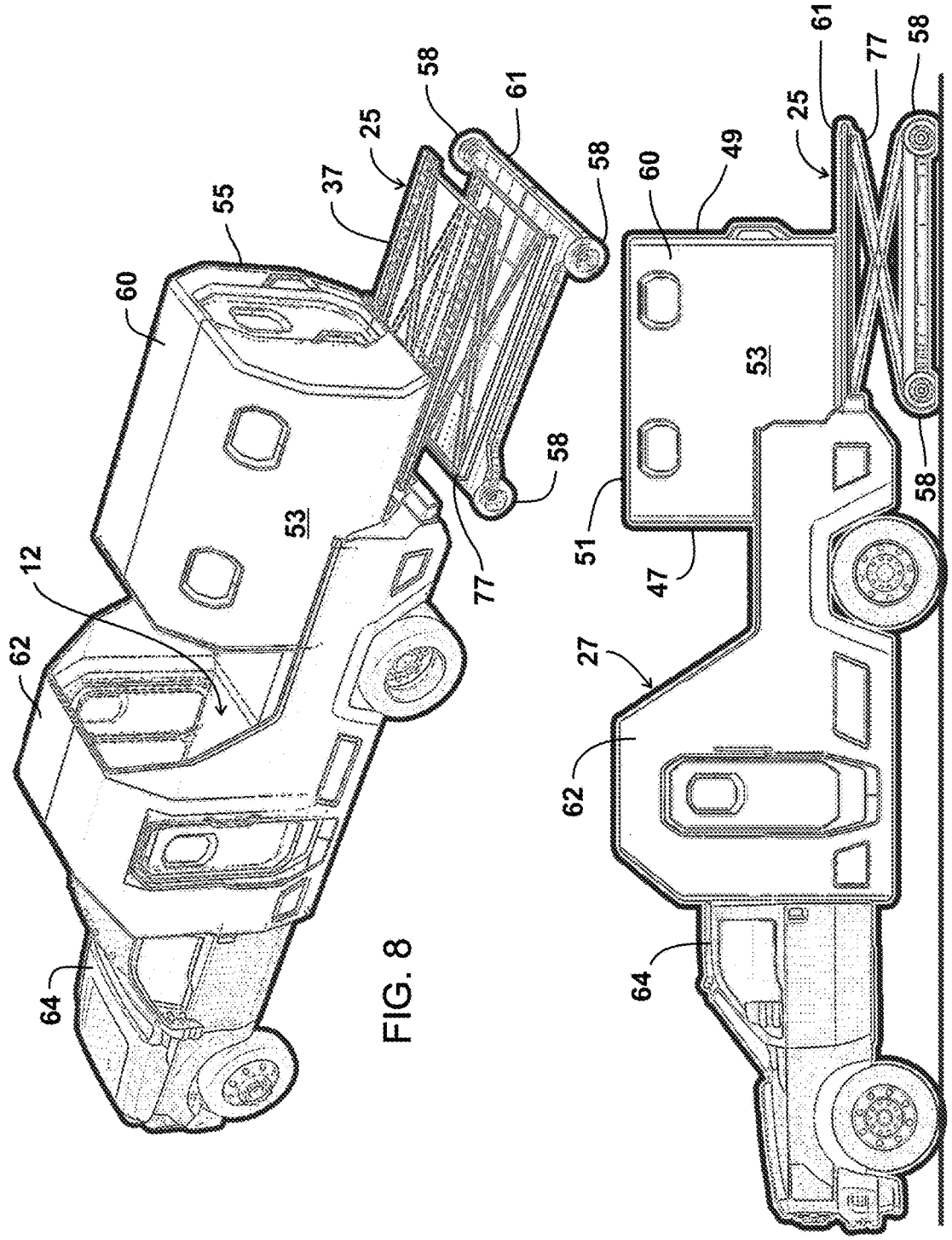

MOBILE HYPERBARIC UNIT

CROSS-REFERENCE TO RELATED APPLICATIONS

This application claims benefit of U.S. Provisional Patent Application Ser. No. 62/421,955, filed 14 Nov. 2016, which is hereby incorporated herein by reference, and priority of/to which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved mobile hyperbaric apparatus and method. More particularly, the present invention relates to a pod equipped to provide hyperbaric oxygen medical treatment to a patient, and a chassis that is adapted to transport the pod to various locations.

2. General Background of the Invention

The benefits of hyperbaric treatment in cases of severe trauma are becoming more realized. Currently, in the offshore commercial diving industry, deck decompression chambers (DDC's) are kept onsite to provide recompression protocols for divers returning from significant depths and to treat the decompression illness. DDC's are pressure vehicles for human occupancy (PVHO). Qualified/certified medical technicians are required outside the DDC to determine medical protocol and in life-threatening situations, are required to enter the PVHO to render examination and treatment.

Hyperbaric treatment includes breathing pure oxygen in a pressurized room or chamber where the air pressure is increased to about three times higher than normal air pressure. This change in pressure and introduction of pure oxygen facilitates recovery and operation of the entire cardiovascular system, nervous system and neurological functions.

Currently, PVHO's are also found in medical and military facilities world-wide to provide treatment for various ailments employing hyperbaric oxygen therapy. At such facilities, medical technicians are available for support both outside and inside the PVHO.

Hyperbaric oxygen (HBO) therapy has been approved for treatment for the following: carbon monoxide poisoning, air or gas embolism, crush injury, compartment syndrome, acute traumatic ischemias, decompression sickness, severe anemia, intracranial abscess, necrotizing soft tissue infections, acute thermal burn injury, clostridas myositis and myonecrosis (gas gangrene), delayed radiation injury and compromised grafts and flaps.

In the emergency medical treatment environment, emergency hyperbaric oxygen (HBO) medical treatment provides life-sustaining and, in some cases, life-saving medical therapy. In emergency medical conditions, such as carbon monoxide poisoning, air/gas embolism with or without or cardiopulmonary arrest, a patient's only hope for survival or limb preservation may be emergent HBO treatment.

Currently, a patient in need of HBO must await the commencement of HBO treatment upon arrival and introduction into a pressure vessel for human occupancy (PVHO) at a HBO medical facility staffed with medically certified technicians working under the direction and supervision of HBO board certified physicians. In the best instance, emergency facilities are attached to university, military, private and public hospitals.

There are several hyperbaric chamber models (PVHO) on the market in the offshore commercial diving industry that are transportable, though the mobility is reliant on independent modes of transportation. The PVHO must first be detached from its onsite location, usually attached within or onto a maritime vessel and placed via crane onto a truck or air evacuation modality. All of the PVHO's support and components, namely the gas tanks and compression providence system (compressor and volume tanks storing needed gases) must be also be detached and transported while linked to the PVHO. Emergency medical technicians, inside and outside the PVHO, must also accompany the PVHO in route unless the transport vehicle is staffed to sustain the PVHO interior pressure and gas transfer to the patient.

Presently the market does not offer a system which is self-contained with its compression and gas storage capability while at the same time including a system that allows the capability of an emergency medical technician to provide all forms of conventional EMS ambulance support of a patient within the PVHO rated ambulance hyperbaric chamber compartment during transportation. During HBO treatment, there are designated time limits for physicians serving the patient, within range of the operation of the system of the present invention.

The following US patents and Publications are incorporated herein by reference:

| U.S. Pat. No. / PUB NO. | TITLE | ISSUE/PUB DATE MM/DD/YYYY |
|---|---|---|
| 5,626,151 | Transportable life support system | May 6, 1997 |
| 6,062,215 | Hyperbaric oxygen patient treatment system | May 16, 2000 |
| 6,461,290 | Collapsible isolation apparatus | Oct. 8, 2002 |
| 6,497,231 | Hyperbaric oxygen chamber | Dec. 24, 2002 |
| 6,899,103 | Self contained transportable life support system | May 31, 2005 |
| 9,138,366 | Hyperbaric apparatus with storage compartment | Sep. 22, 2015 |
| 2009/0250063 | HYPERBARIC/HYPOXIC CHAMBER SYSTEM | Oct. 8, 2009 |
| 2013/0047988 | Hyperbaric Chamber System and Related Methods | Feb. 28, 2013 |

The following Foreign patents are hereby incorporated herein by reference: CN2715737; CN104398359; CN203619824.

BRIEF SUMMARY OF THE INVENTION

The concept of the present invention provides the mobility, self-sustaining pressure and gas environment capability, and medical technician hands-on accessibility that is not found in any other PVHO providing any mobility. The concept of the present invention provides a unique and needed platform to provide emergency hyperbaric oxygen therapy in a timely and emergent process. Considering the medical necessity of providing the HBO-in-need patient with timely pressurization, the concept of the present invention reduces the "window of opportunity for emergent treatment" time span between "need" and "treatment".

The concept of the present invention brings both the platform for treatment (PVHO) and the medical care providers (HBO trained medical technicians) to the patient in need rather than bringing the patient to the platform and providers. This reduces the medical interventional "window of opportunity".

The mobility aspect of the present invention allows it to reach the scene of a severe trauma incident within about 10-15 minutes, at which point a patient can be loaded onboard via a standard collapsible stretcher. This window of time will drastically improve the survival/recovery rate for a victim if treatment can be delivered quickly and seamlessly. The modularity aspect of the present invention allows the hyperbaric pod to seamlessly connect to a larger chamber, or other mobile platforms such as air flight units or marine vessels. The hyperbaric pod of the present invention is preferably a self-sustained unit that has a pressure relief and regulation system to maintain pressure which can be sustained for about 15 to 30 minutes when not connected. The present invention including hyperbaric pod can have dual couplings on the front and rear face of the pod for attaching the air hoses necessary to bring it to the desired pressure. The desired pressure of the pod can be about three times higher than normal air pressure or ambient pressure. The present invention including hyperbaric pod can have dual digital communication systems which can connect via a main data port coupling on front and rear face of the hyperbaric pod. The hyperbaric pod has a power charge port on the front face for connecting to the vehicle or chassis of the present invention or hospital charge bays.

The present invention includes a mobile patient treatment unit, the unit preferably comprising a pod and a chassis, wherein the pod is preferably equipped to provide hyperbaric oxygen medical treatment to a patient, and the chassis is preferably adapted to transport the pod to various locations.

In various embodiments, the pod preferably comprises one or more of the following: overhead supply storage; patient monitoring; system communication; code cart; paramedic seating station; patient stretcher/support; adjustable stretcher armature; hyperbaric system control.

The unit thereby can provide standard medically supported transport of patients not needing hyperbaric medicine. This would allow the unit to concurrently earn its keep with EMS management of all patients needing or not needing hyperbaric treatment.

In various embodiments, the chassis can be equipped with a control panel that allows a user outside the pod to control settings inside the pod.

In various embodiments, the chassis further comprises one or more of the following:
compressed air mobile tank; auxiliary oxygen tank; electrical inverters; lithium battery cells; omni-directional wheels; in-hub drive motors; user control interface/control panel.

In various embodiments, the present invention can be a vehicle without need of a specially equipped loading dock and chassis for moving the pod and chassis during patient treatment.

In various embodiments, the vehicle can preferably be a van or ambulance type of vehicle.

In various embodiments, the vehicle can preferably be a watercraft.

In various embodiments, the vehicle can preferably be an aircraft.

In various embodiments if a loading dock were desired, it would preferably further comprise one or more of the following: a chamber technician cabin; triple battery system; backup generator oxygen tanks; auxiliaries; main air compressors; reserve air compressors; air compression tank reservoir; communication/data ports; air/oxygen hookups; power line ports; locking track guides; load/unload gate.

The present invention includes a method of using the mobile treatment unit of any of the above embodiments to provide hyperbaric oxygen medical treatment to a patient.

In various embodiments, the method further comprises the steps of: transporting the pod to the location of a patient in need, placing the patient in the pod, treating the patient in the pod while simultaneously transporting the pod with patient to a facility having a larger multiplace hyperbaric system room or chamber, connecting the pod to the larger multiplace hyperbaric system room or chamber such that the pressure of the pod and the room or chamber remain constant for the patient, transporting the patient from the pod to the room or chamber without disrupting the treatment pressure for the patient, and disconnecting the pod from the room or chamber without disrupting the treatment pressure for the patient.

The present invention includes a mobile hyperbaric apparatus including a vehicle having a vehicle chassis with a front cabin and a rear bed. A partition can extend upwardly from the bed at a position next to the cabin. A pod can be removably attachable to the vehicle chassis, the pod having top wall, left and right side walls, a front wall, a rear wall, and a bottom wall that can be sized and shaped to occupy and rest upon the rear bed. A detachable connection enables attachment or detachment of the pod from the vehicle chassis. The connection can be connected to the pod at the bottom wall. The partition can have a portion that extends at least partially over the pod top wall. A pod chassis can enable the pod to be transported independently of the vehicle chassis. The pod chassis can have a lift that enables elevation of the pod between lower and upper positions. A control station that has ambient pressure can be located in between the partition and the pod. A desired pressure that is not ambient pressure can be maintained within said pod interior.

In various embodiments, the detachable connection includes a conveyor track system and locking teeth.

In various embodiments, the pod can be sized and shaped to hold a patient and one or more paramedics.

In various embodiments, the present invention further comprises means on the pod for maintaining a desired pressure within the pod interior when detached from the vehicle.

In various embodiments, the present invention further comprises a hatch fitting on the pod rear wall that can mate to a corresponding hatch fitting at hospital hyperbaric system chamber.

In various embodiments, the pod chassis can be equipped with a control panel that allows a user outside the pod to maintain a desired pressure within the pod interior when detached from the vehicle.

In various embodiments, the pod chassis can be fixed to the pod.

In various embodiments, the pod chassis can be driven on its own power.

In various embodiments, the pod chassis includes a conveyor system.

In various embodiments, the pod chassis can have omnidirectional wheels.

In various embodiments, the pod includes pod couplings that are connected to rear bed couplings, and wherein the pod and rear bed couplings assist with operating the hyperbaric systems inside the pod.

The present invention includes a mobile hyperbaric apparatus including a vehicle having a front cab and a rear bed, the rear bed including a loading surface and a partition that extends upwardly from the loading surface. A pod can be removably attachable to the vehicle rear bed, the pod having top wall, left and right side walls, a front wall, a rear wall, and a bottom wall that can be sized and shaped to occupy and rest upon the loading surface. A detachable connection can enable attachment or detachment of the pod from the vehicle rear bed. The partition can have a portion that extends at least partially over the pod top wall. A pod chassis can enable the pod to be transported independently of the vehicle chassis. The pod chassis can be secured to the pod bottom wall. A control station that has ambient pressure can be located in between the partition and the front cab. A desired pressure that is not ambient pressure can be maintained within said pod interior by means on the vehicle.

In various embodiments, the pod chassis can be secured to the pod.

In various embodiments, the detachable connection can be connected to the pod chassis.

The present invention includes a method of administering hyperbaric oxygen medical treatment to a patient with a mobile treatment unit.

In various embodiments, the method comprises the steps of:

a) providing a mobile hyperbaric vehicle having a front cab and vehicle chassis, the vehicle chassis having a cabin and a rear bed;

b) transporting the mobile hyperbaric vehicle to a location of a patient needing emergency medical treatment;

c) placing the patient in a pod having top wall, left and right side walls, a front wall, a rear wall, and a bottom wall that can be sized and shaped to occupy and rest upon the rear bed;

d) treating the patient in the pod by increasing the pressure in the pod to a desired pressure that is not ambient pressure via a control station in the cabin having ambient pressure, while simultaneously transporting the vehicle and pod with patient to a facility having a hospital hyperbaric system chamber;

e) detaching the pod from the rear bed;

f) transporting the pod to the hyperbaric system chamber on a pod chassis;

g) connecting the pod to the hyperbaric system chamber such that the desired pressure in the pod and the chamber remain constant for the patient;

h) transporting the patient from the pod to the chamber without disrupting the treatment pressure for the patient; and i) disconnecting the pod from the chamber without disrupting the treatment pressure for the patient.

In various embodiments, the cabin can be sized and shaped to hold a paramedic or technician.

In various embodiments, the pod rear wall includes a hatch fitting that connects to a hatch fitting on the hospital hyperbaric system chamber and thereby creating an airtight seal between the pod and the chamber.

In various embodiments, the pod chassis can have a lift that enables elevation of the pod between lower and upper positions.

In various embodiments, the pod couplings can be disconnected from the cabin couplings.

In various embodiments, the pod includes pod couplings and the hospital hyperbaric system chamber includes chamber couplings, and wherein the pod couplings and chamber couplings can be connected.

In various embodiments, the desired pressure in the pod can be between about 2-4 atmospheres of pressure (203-405 kPa).

In various embodiments, the desired pressure in the pod can be about three times higher than normal air pressure.

In various embodiments, the pod can include one or more of the following supply items: overhead supply storage, patient monitoring systems, system communication, code cart, paramedic seating station, patient stretcher/support, adjustable stretcher armature, hyperbaric system control.

In various embodiments, the pod chassis can include one or more of the following items of equipment: compressed air mobile tank, auxiliary oxygen tank, electrical invertors, lithium battery cells, in-hub drive motors, user control interface/control panel.

In various embodiments, the vehicle chassis of the vehicle can include one or more of the following: triple battery system, backup generator, oxygen tanks, auxiliaries, main air compressors, reserve air compressors, air compression tank reservoir, communication/data ports, air/oxygen hookups, power line ports, locking track guides, load/unload gate.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 6 is a perspective view of a preferred embodiment of the apparatus of the present invention showing pod separated from loading dock;

FIG. 7 is a side view of a preferred embodiment of the apparatus of the present invention showing pod separated from loading dock;

FIG. 8 is a perspective view of a preferred embodiment of the apparatus of the present invention showing pod during removal from loading dock;

FIG. 9 is a side view of a preferred embodiment of the apparatus of the present invention showing pod during removal from loading dock;

DETAILED DESCRIPTION OF THE INVENTION

Figure 1:
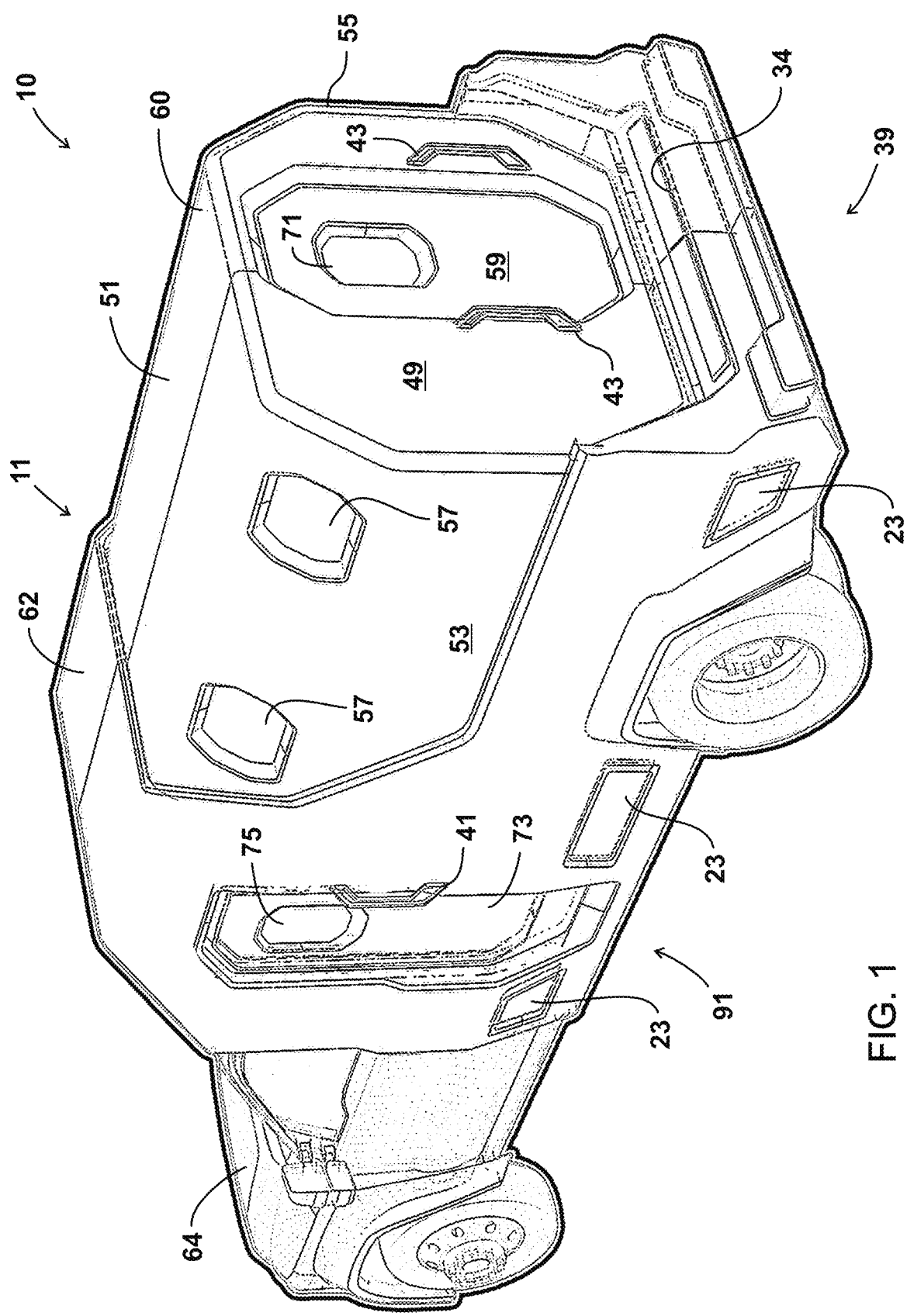
FIG. 1 is a rear perspective view of a preferred embodiment of the apparatus of the present invention.
Figure 2:
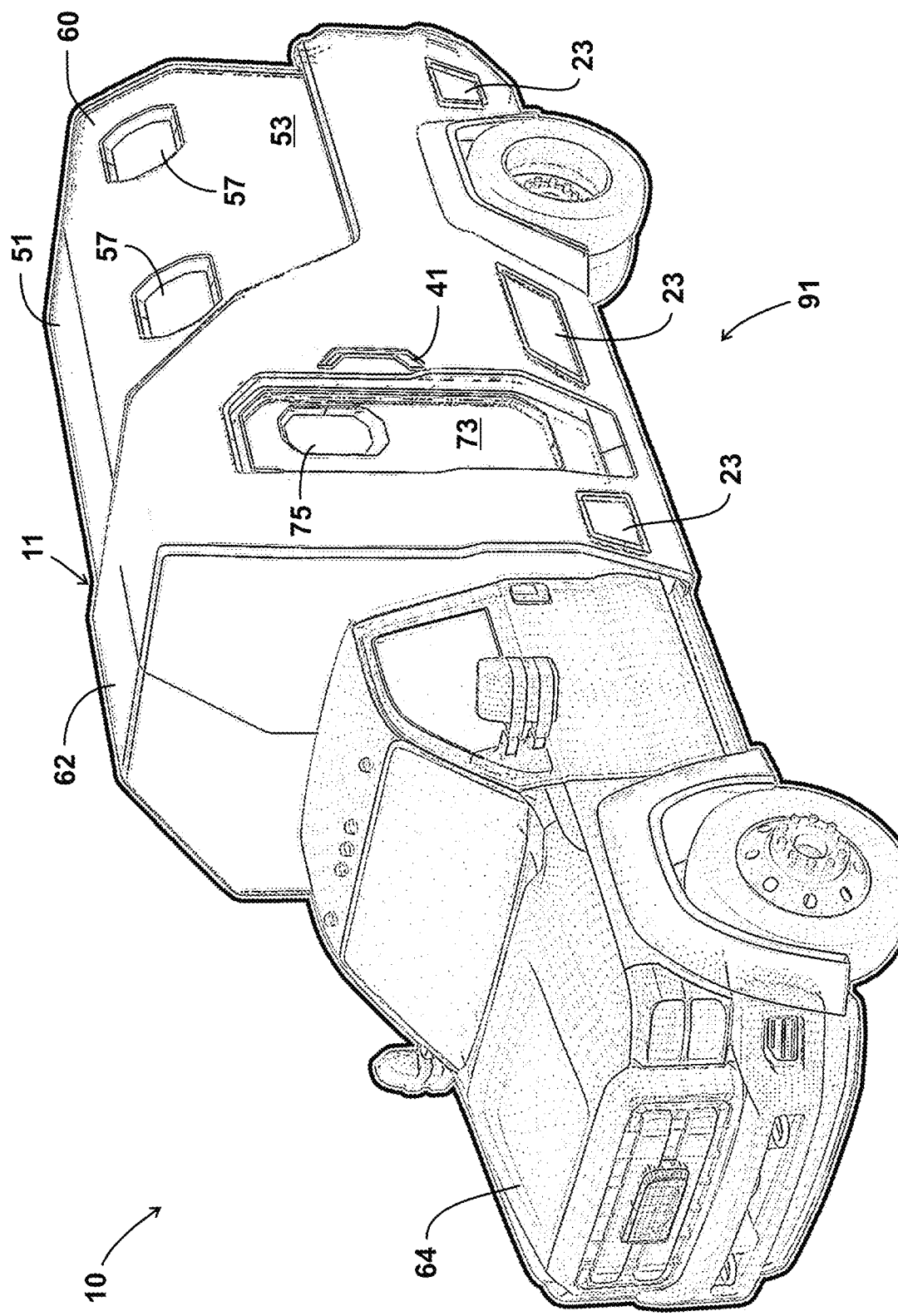
FIG. 2 is a front perspective view of a preferred embodiment of the apparatus of the present invention.
Figure 3:
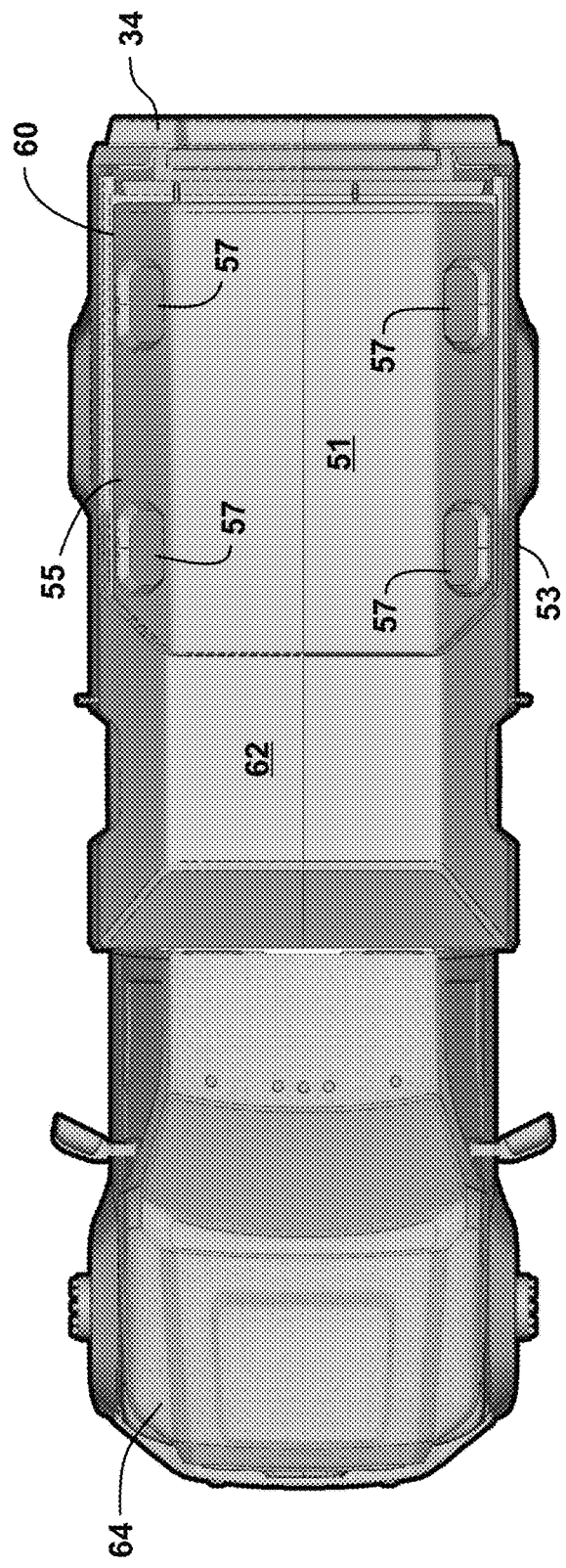
FIG. 3 is a top view of a preferred embodiment of the apparatus of the present invention.
Figure 4:
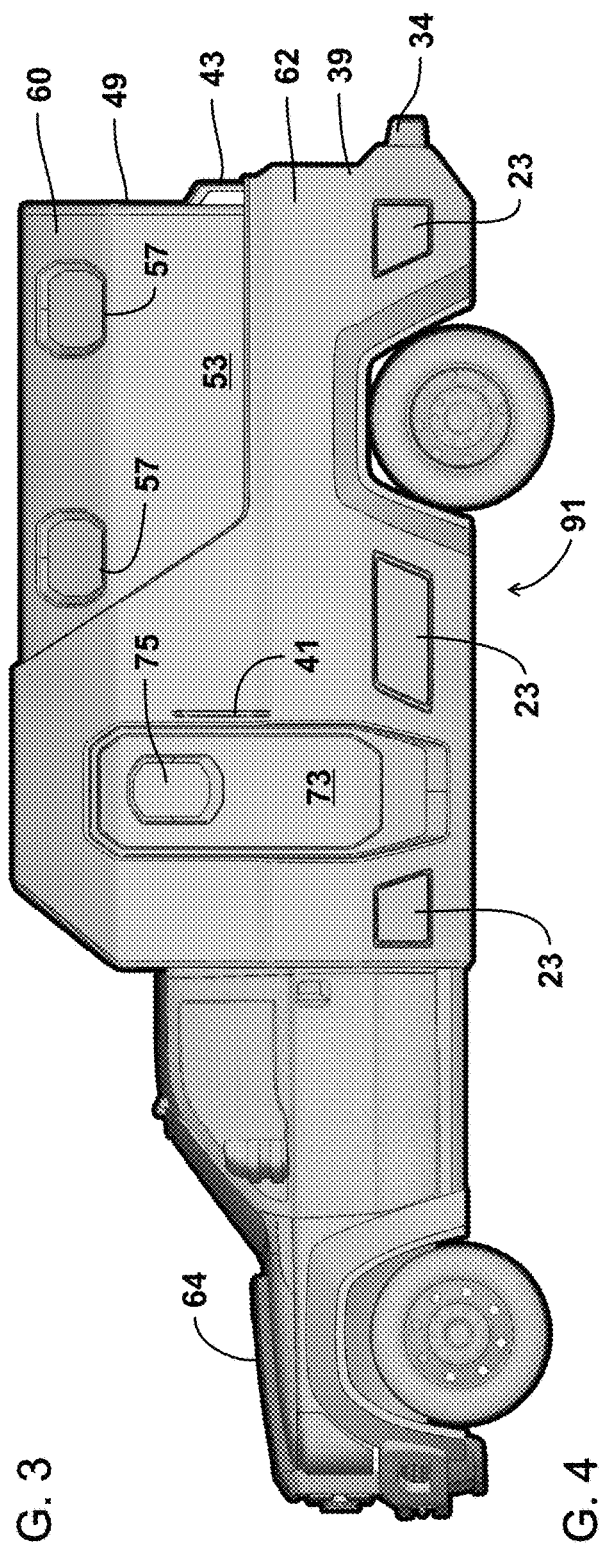
FIG. 4 is a side view of a preferred embodiment of the apparatus of the present invention.

FIGS. 1-27 show views of a preferred embodiment of the vehicle apparatus of the present invention, designated generally by the number 10. Vehicle 10 provides a chassis such as a wheeled truck or van chassis 91. Chassis 91 can include a cab 64 for an operator and passenger(s), an engine compartment and transmission, and a rear bed 39. Such a vehicle chassis 91 is commercially available from General Motors, Ford or Dodge as examples. The exterior design of the vehicle 10 includes rear bed 39 having a semi-enclosed loading dock 62 preferably over the rear axle of the vehicle 10, where a pod 60 rests, and preferably locks in place.

Figure 22:
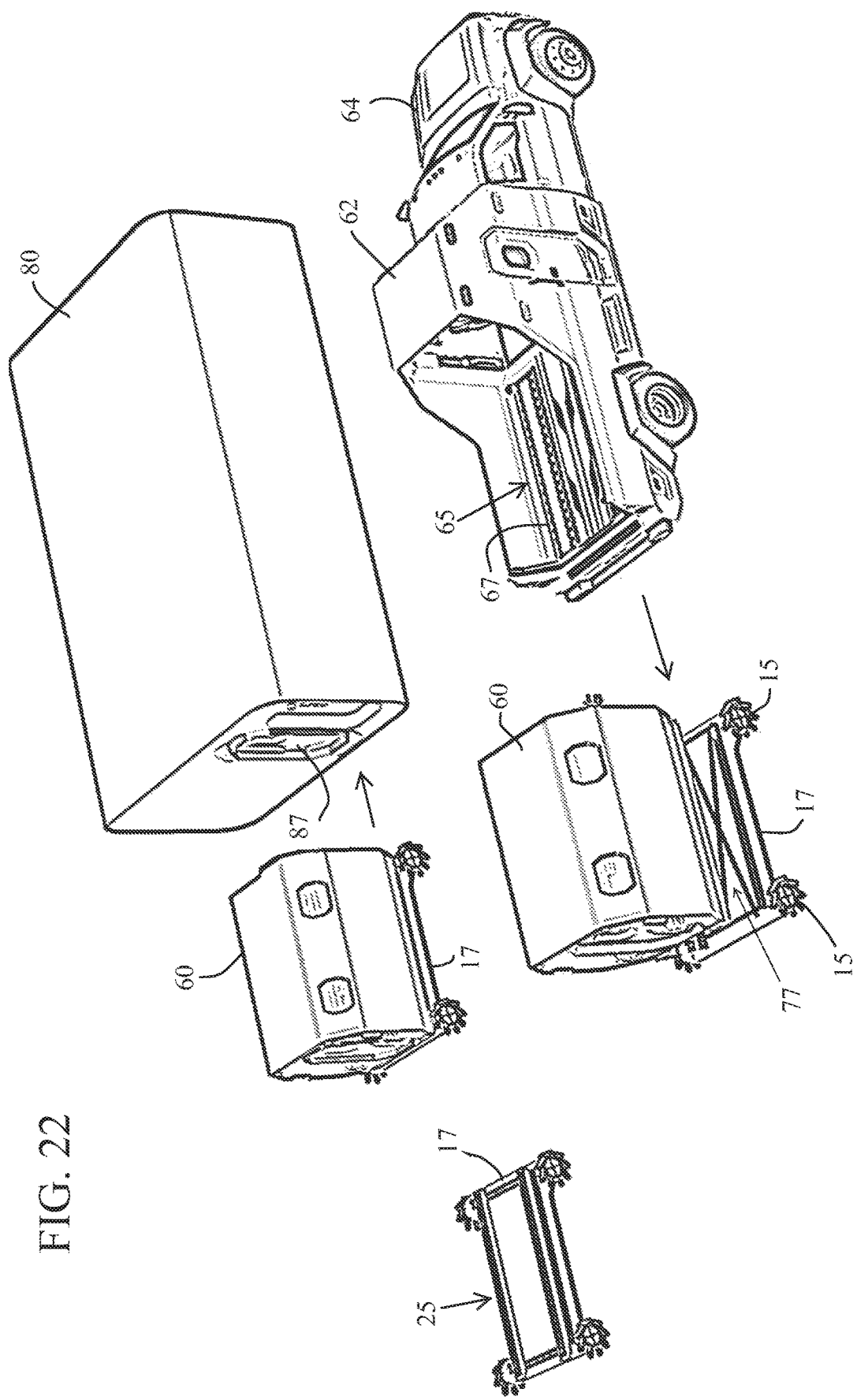
FIG. 22 is a perspective view of a preferred embodiment and method of the present invention.
Figure 23:
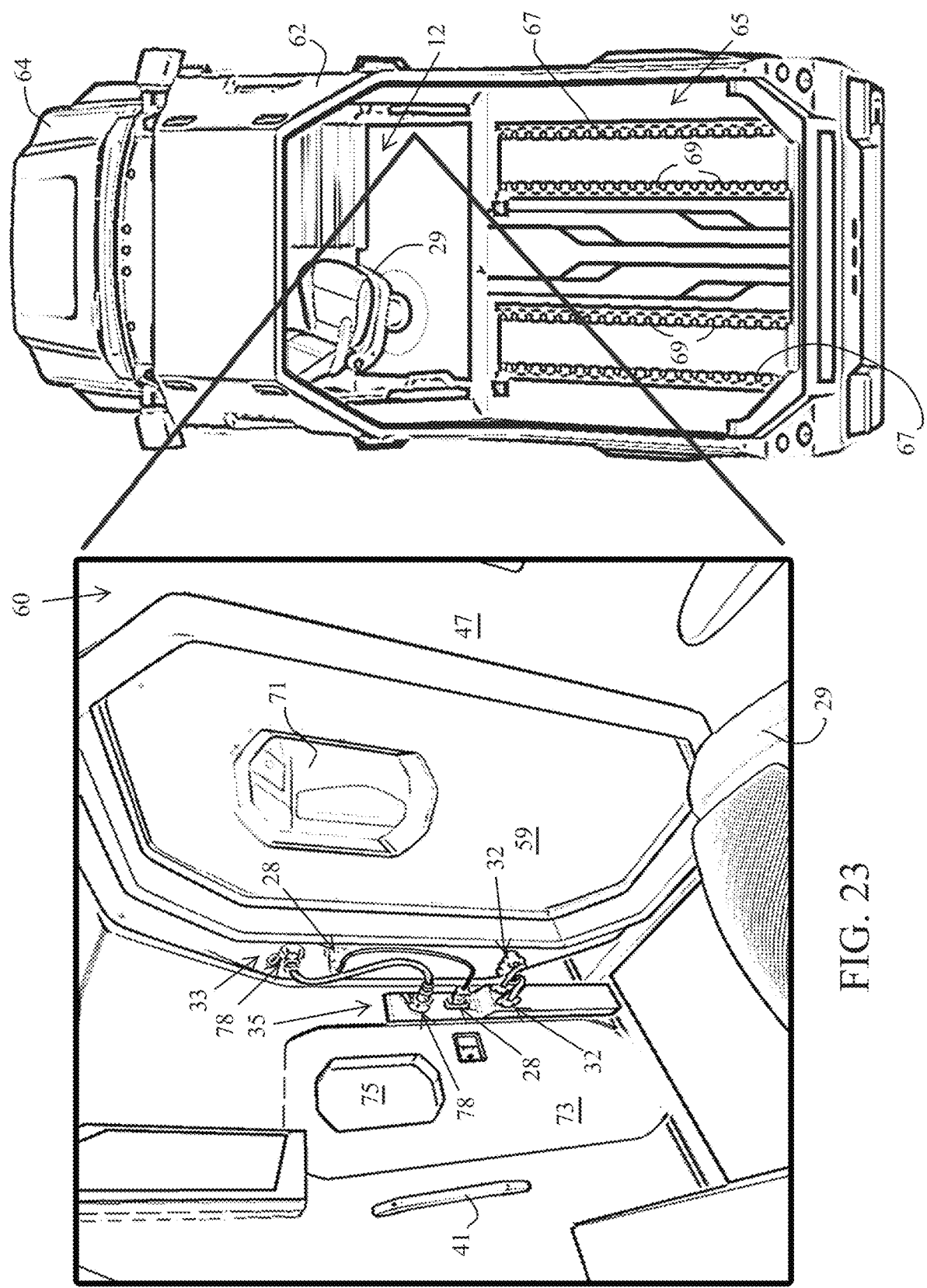
FIG. 23 is a partial perspective view of a preferred embodiment of the present invention.

In a preferred embodiment of the present invention, the loading dock 62 preferably has a flat surface area 65 which can include a conveyor track system 67, preferably with locking teeth 69, which can lock into the pod 60 subframe chassis 81 underneath at pod bottom 45, see for example FIGS. 22, 23. Pod 60 subframe chassis 81 underneath at pod bottom 45 can have similar locking teeth to mate or connect with the locking teeth 69 of track system 67 and preferably secure pod on loading dock 62 of vehicle 10. The loading dock 62 flat surface 65 can allow for a chassis 17, 61 to roll or slide onto the loading dock 62, as seen in FIGS. 5-9. In a preferred embodiment, the mobile chassis 17, 61 includes a hydraulic scissor lift system 77 to raise or lower the level of the pod 60 on chassis 17, 61 so that the pod 60 can be loaded on board vehicle 10 on flat surface 65 of loading dock 62. Chassis 17, 61 holding pod 60 can also be lowered and transported to a desired location, such as a hospital facility 84. With the pod 60 fully docked on the vehicle rear bed 39, the apparatus 10 can exhibit all the typical characteristics of a traditional ambulance, and can be operated as such.

A preferred embodiment 10 consists of two main vessels: a chamber or pod 60 preferably with interior space for at least one (1) patient 70, 1 or more paramedics 72, 74, and standard EMS supplies necessary to treat severe trauma. The pod 60 preferably can dock aboard the second main vessel: a properly outfitted vehicle 10 preferably built on a class 3-4 truck chassis 91 as shown in FIGS. 1-4, having loading dock 62.

Pod 60 can have sidewalls 53, 55, top 51, front wall 47 and rear wall 49. Front wall 47 is preferably a connecting end that is secured to an opening area/partition 27 on docking system 62 at a connection 11. Sidewalls 53, 55 of pod 60 can be straight, curved, bent or other suitable curvature in shape. Pod 60 preferably has door 59 on rear wall 49 that allows for access to the interior 13 of pod 60. Pod 60 can also have door 59 on front wall 47 that allows for access to a tech station/cabin 12 of loading dock 62. Handles 43 can be attached to rear wall 49 near door 59 to assist with access into and out of pod 60. Patient 70 and paramedics 72, 74 can use door 59 to enter and exit pod 60. Pod 60 can also have windows 57 on pod sidewalls 53, 55 to allows for viewing into the pod 60. Door 59 can have window 71 to allow for viewing into and out of pod 60.

In an embodiment of the present invention, the pod 60 can be a chamber including a solid steel or alloy tube with the plumbing/piping exposed on the exterior. In another embodiment of the present invention, pod 60 preferably includes a core chamber/structure which can be eight (8) planes of alloy material capped at both ends welded together, preferably the plumbing and piping running outside of that core, and a fiberglass shell covering the core and the piping.

Pod 60 rear wall 49 can have a hatch connection or fitting 63 that is preferably a clamp device such as a posterior mechanical pressure air lock clamp. Hatch connection/fitting 63 can extend radially away from wall 49. Connection/fitting 63 can be a mating connection that is preferably joined with a corresponding hatch connection/fitting 83 of a hyperbaric system room or chamber 80 at a hospital facility 84, as seen in FIGS. 24-27. A protruding lip preferably made of a structural alloy around the exterior of the hatch/fitting 83 of room/chamber entry 87 seals and functions as an airlock between pod 60 and room/chamber 80. The mated and connection 90 of fitting 63 and fitting 83 preferably creates an air-tight seal between pod 60 door 59 and entry door 87 hyperbaric system room/chamber 80 so that the pressure in the pod 60 and hyperbaric system room/chamber 80 remain constant and unchanged during transfer of patient 70 from pod 60 into hyperbaric system room/chamber 80.

Figure 5:
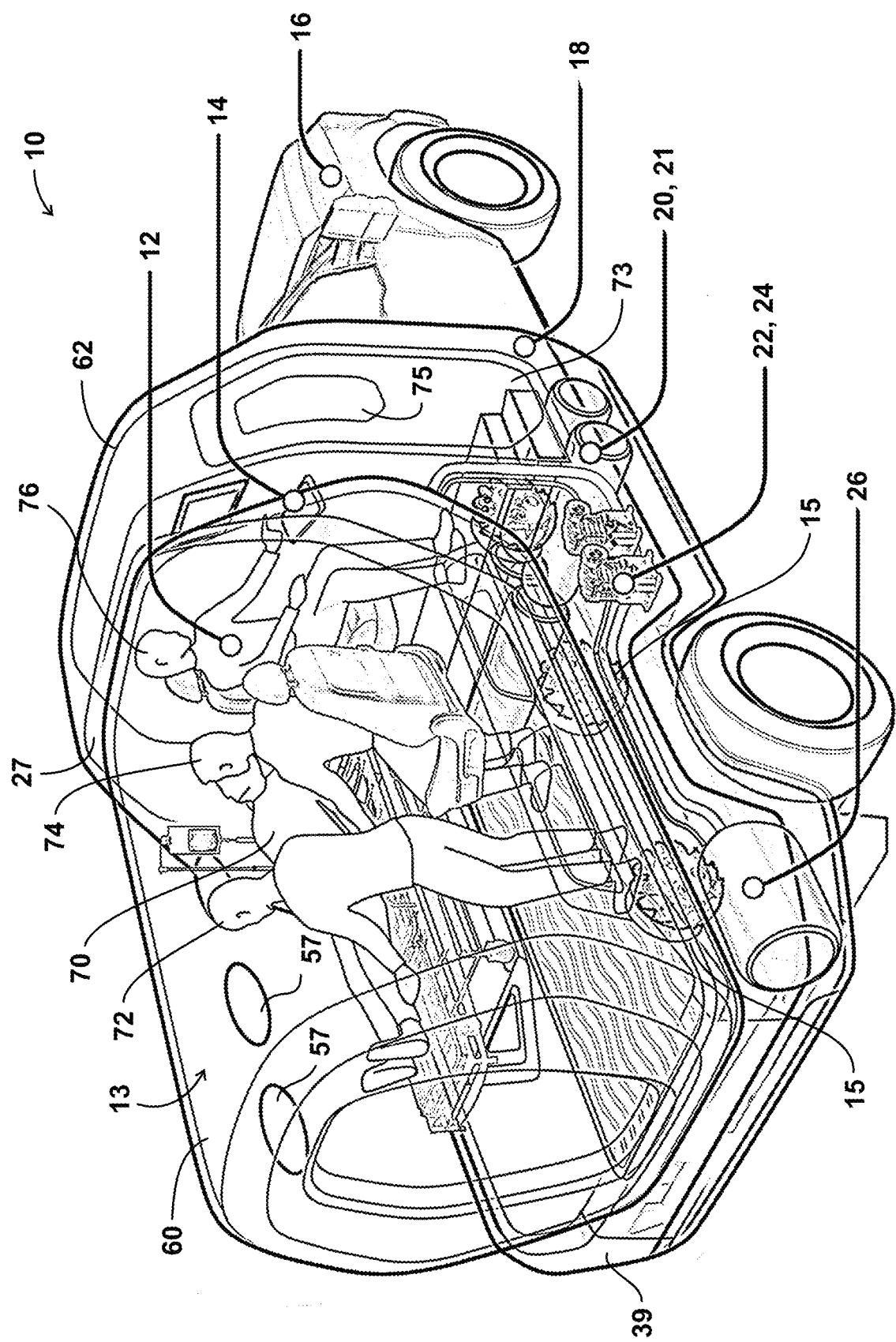
FIG. 5 is a perspective transparent view of a preferred embodiment of the apparatus of the present invention.
Figure 11:
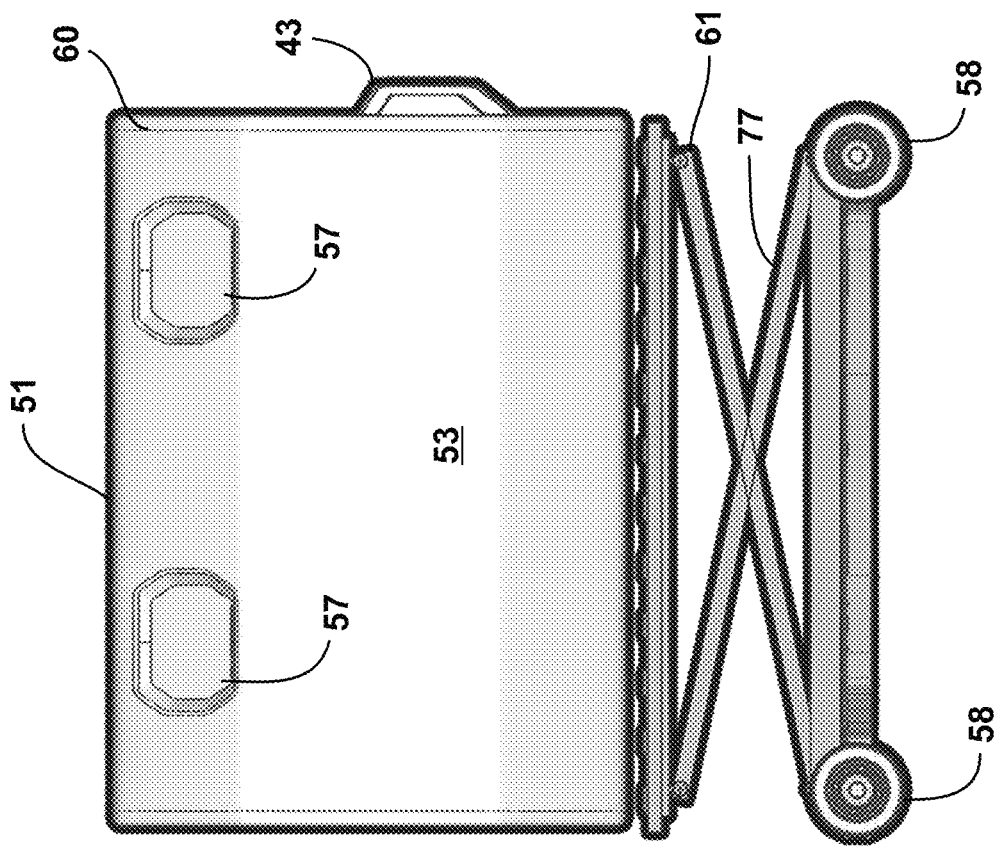
FIG. 11 is a fragmentary side view of a preferred embodiment of the apparatus of the present invention showing the pod.
Figure 10:
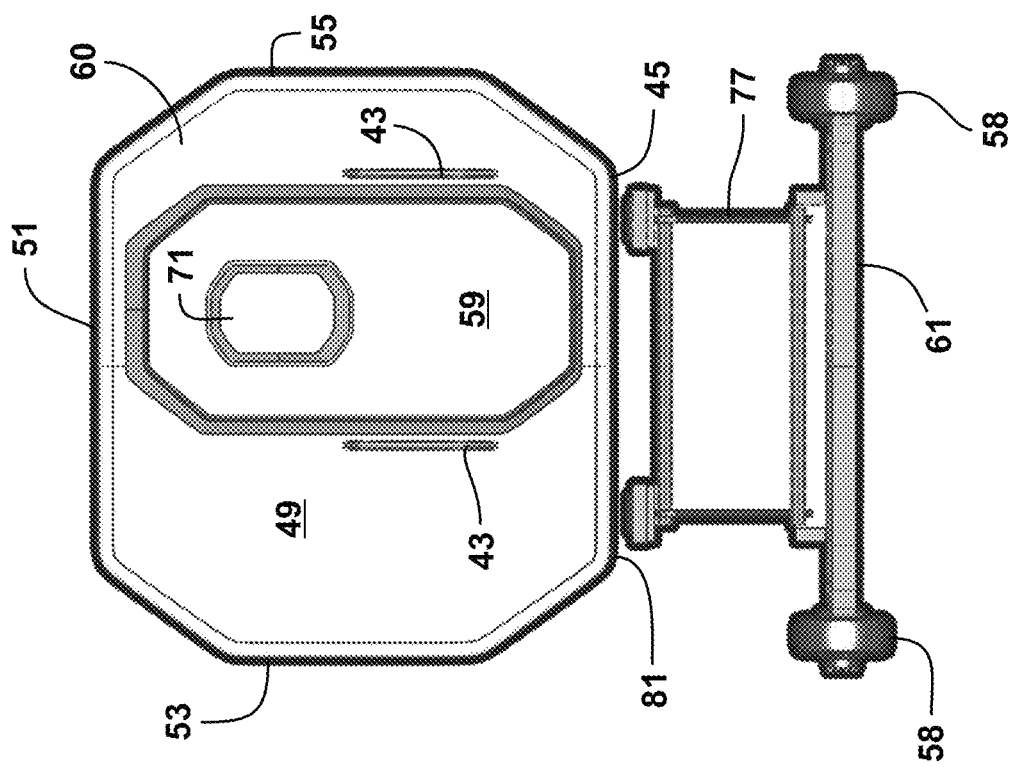
FIG. 10 is a fragmentary front view of a preferred embodiment of the pod of the present invention showing the pod.

Rear bed 39 includes a docking system/loading dock 62 that preferably secures pod 60 to a vehicle 10 in order to transport pod 60 carrying patient 70 and technicians 72, 74 to a specially equipped hospital 84. Docking system 62 includes a tech station/cabin 12 with technician chair 29, which allows for a control technician 76 to monitor and operate the hyperbaric systems occurring inside of pod 60. Cabin 12 is preferably positioned in between front cab 64 and opening/partition 27. Cabin 12 preferably has ambient pressure and is preferably unpressurized. Cabin 12 can have one or more doors 73, as seen in FIGS. 1, 6, preferably with adjacent handles 41 on the exterior and interior of dock 62 that assists with access to and from tech station 12. Preferably doors 73 include window 75. Docking system 62 can also include areas or compartments 23 on the external body of dock 62, where items can be stored, such as EMS equipment, or areas 23 can be access panels to allow for access to tanks and other systems, such as main air compressors 22 and auxiliary air compressors 24, piping system which runs in between the interior walls (preferably made of alloy or other suitable material) and exterior shell of the pod 60, oxygen tanks 20, compressed air reservoir tank 26, backup power generator 18, which can be located within the loading dock 62 as seen in FIG. 5.

The docking system 62 preferably connects the pod 60 to all the primary support systems onboard the vehicle 10. These support systems include: main air compressors 22 and auxiliary air compressors 24, oxygen tanks 20, compressed air reservoir tank 26, backup power generator 18, communication system 28 located on the rear panel of the pod 60 as seen in FIG. 23, and an external technician station 12 which includes a control board 14 for the entire hyperbaric system 10. In a preferred embodiment of the present invention, the pod 60 preferably connects to the main vessel cab 64 and loading dock 62 via a series of couplings (such as a main communication port 28 and pressure hose system 32 as seen in FIG. 23) which are preferably accessible from the inside of the cabin interior 12 of the loading dock 62, as seen in FIG. 23. FIGS. 23-27 show connections/ports/hook ups in between pod 60 and cabin 12, and in between pod 60 and chamber 80. These connections/hook ups include electrical/accessory port 78, communication/data port 28, hydraulic/pressure hose system port 32.

In a preferred embodiment of the present invention, there are preferably one 1 hp (horsepower) (745 W) main air compressors 22, more preferably two electric main air compressors 22, and most preferably, two 2 hp (horsepower) (1.49 kW) air compressors 22. A main air compressor, such as 5 hp (horsepower) (3.72 kW) compact compressor module, which is commercially available, is an example of a type of main air compressor that can be used in a preferred embodiment of the present invention.

In a preferred embodiment of the present invention, there are preferably one twin auxiliary air compressors 24. In a preferred embodiment of the present invention, there are preferably one standard issue oxygen tanks 20, more preferably two standard issue oxygen tanks 20, and most preferably, three standard issue oxygen tanks 20.

FIG. 5 shows a perspective transparent view of pod 60 docked aboard the vehicle bed 39 in docking station 62. The tech station/cabin 12 preferably has room for at least one (1) hyperbaric control technician 76, preferably operating the pod 60 when it is docked in docking station 62 onboard vehicle 10. Cabin 12 is preferably positioned in between front cab 64 and opening/partition 27. Cabin 12 preferably has ambient pressure and is preferably unpressurized. The hyperbaric system control 14 which can be in cabin 12 preferably maintains communication with the occupants 70, 72, 74 in the pod 60 and controls all the main functions of the hyperbaric system levels/pressure.

The vehicle 10 is preferably driven by a high output diesel powertrain, and preferably has multiple backup batteries 16 to support the pod 60 and preferably a backup generator 18 in case of a total power failure. In a preferred embodiment of the present invention, the vehicle 10 preferably has one to two backup batteries, more preferably two to three backup batteries, and most preferably, three backup batteries. Main oxygen tanks 20 can be located at chassis level of docking station 62, preferably below the tech station 12. In a preferred embodiment of the present invention, the vehicle 10 preferably has one to two oxygen tanks 20, more preferably two to three oxygen tanks 20, and most preferably four oxygen tanks 20. Preferably, a two-stage air compressor system, including main air compressors 22 and reserve air compressors 24, is located onboard the vehicle 10 as seen in FIG. 5. Preferably, an air compression tank reservoir 26 is located onboard the vehicle 10 as seen in FIG. 5.

FIGS. 6-9 show the two vessels (pod 60 and loading dock 62/cab 64) separated in exploded views. Preferably, the vehicle 10 is designed to mate to a docking bay 85 at a specially equipped hospital or other specialized location 84.

The pod 60 preferably connects to the vehicle 10 at docking station 62 via a series of umbilical support connections 33, 35, preferably including at least:

Communication and Data Ports 28 (these connections are preferably wire connections), Air/Oxygen Ports 32 (these connections are preferably tubes), and Power line Ports 31 (not shown) (these connections are preferably wire connections).

Figures 13, 14:
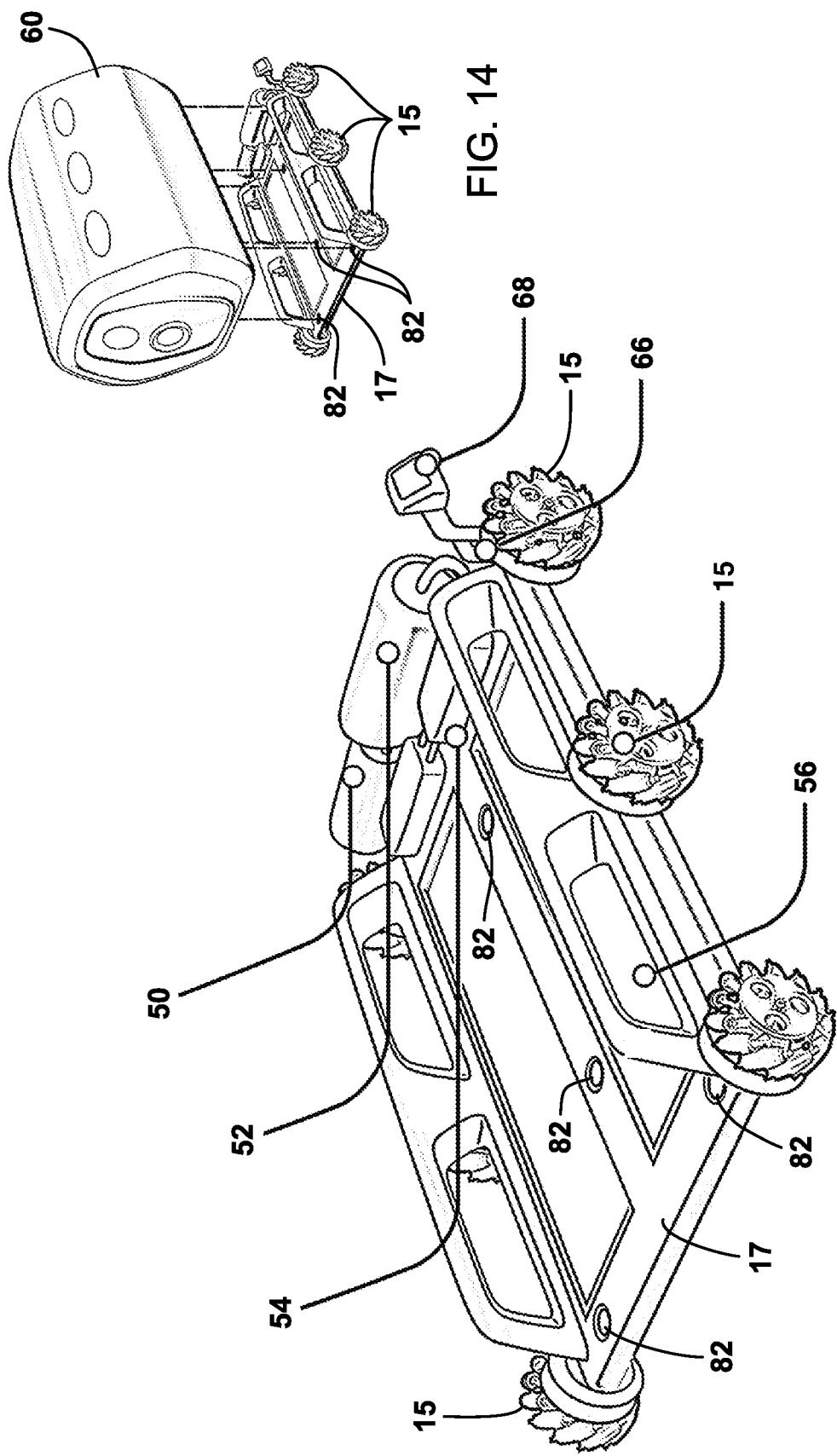
FIG. 13 is a fragmentary perspective view of a preferred embodiment of the apparatus of the present invention showing the pod chassis.
FIG. 14 is a fragmentary perspective view of a preferred embodiment of the apparatus of the present invention showing the pod and chassis.

Preferably, parallel tracks or a conveyor track system 67 can guide the pod 60 into position aboard the vehicle bed 39 and docking station 62, and lock the wheels 15 of pod chassis 17 into place when the chassis 17 is loaded aboard vehicle bed 39, as seen in FIGS. 5, 13-14. In another embodiment, pod 60 can roll or slide into position aboard docking station 62 on vehicle 10, as seen in FIGS. 8-11. In one embodiment the pod 60 can be locked into place by a latching clamp along the conveyor track 67.

Preferably when the vehicle 10 is docked at the hospital loading bay 85, the tailgate 34 can lower to allow the pod 60 to load and unload off loading dock 62.

Once disconnected from the umbilical support connections 35 of loading dock 62, the pod 60 unloads from the vehicle bed 39, preferably driven under its own power.

Figure 12:
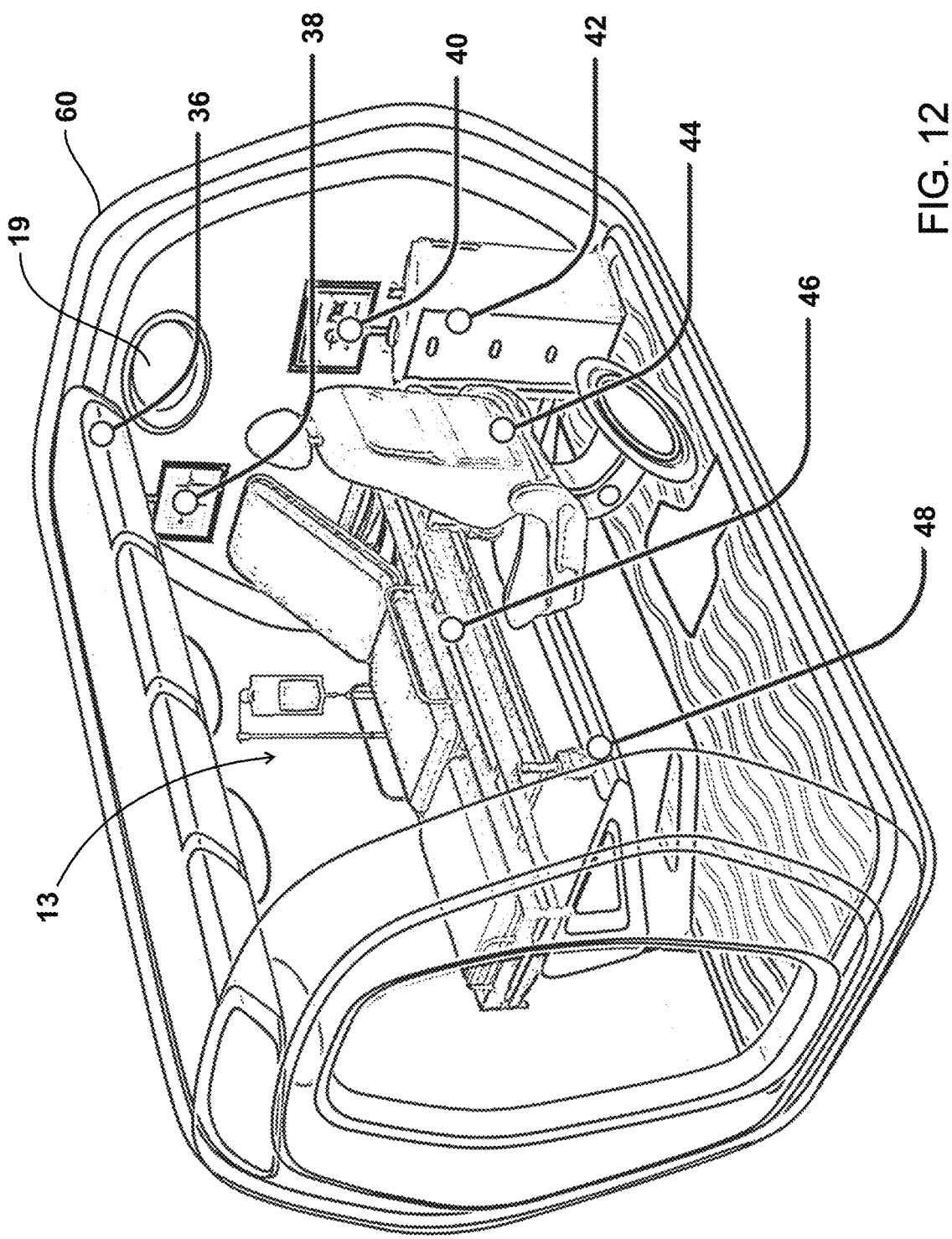
FIG. 12 is a partially cut away view of a preferred embodiment of the apparatus of the present invention showing the pod.

FIG. 12 shows a cross-sectional transparent view of the pod 60 interior 13. Preferably, the pod 60 interior 13 is equipped with all the standard issue supplies of a typical intensive trauma paramedics' ambulance, such as:

overhead storage 36, which saves floor space and secures additional supplies;

patient monitoring station 38, which preferably provides visual reads on the patient condition;

system communication portal 40, which preferably maintains video and audio communications with the techs external of the pod 60 (in a preferred embodiment, the primary communication system is through digital cameras, microphones, and screens in both the interior of the pod 60 and the technician station 12 with a redundant glass port hole window 19 between the pod 60 and technician station 12. EMS technicians will preferably have a predetermined signal system if all systems fail);

a standard code cart 42, which provides emergency medical supplies such as an automated external defibrillator (AED); mechanical chest compressor, medicine, cardiac monitor, and even emergent prehospital Extracorporeal membrane oxygenation (ECMO);

paramedic seating station 44, which provides a seat which preferably can pivot and safely support the paramedic when the vehicle 10 is mobile;

EMS standard collapsible stretcher 46, which preferably can be locked into place; and, adjustable stretcher armature 48, which preferably swings out for easy loading/unloading and pivots to the side when not in use.

FIGS. 12 and 13 show the pod 60 of the present invention in independent operation and loaded onto chassis 17. The pod 60 is preferably fully self-sufficient of all main utilities (such as power, communication, decompression) and able to be driven via a control panel 68 located on the side. Preferably, all of the functionality of the vehicle cab 64 and loading dock 62 can be maintained onboard the pod 60 with limited range.

FIG. 13 shows the pod 60 with a platform chassis assembly 17. Preferably, the pod 60 is secured via connections 82 (such as bolted connections) or otherwise attached to a platform chassis 17, which gives the pod 60 self-sufficient capabilities. Alternatively, pod 60 can also be separate from the chassis 17, and preferably placed on top of a chassis 61 and preferably slid off onto the docking station 62. Chassis 17, 61 can preferably include a conveyor system 37 to assist with movement of pod 60 on and off docking station 62. Chassis 17, 61 can include a scissors lift 77 to preferably lift and lower the pod 60. Scissors lift 77 can be hydraulic or electric. Preferably, lithium ion batteries 56 are mounted flat in a skateboard configuration.

In a preferred embodiment of the present invention, the chassis 17, 61 preferably has one-two lithium ion batteries 56, more preferably two-three lithium ion batteries 56, and most preferably, four lithium ion batteries 56. Preferably, omni-directional wheels 15 (such as Airtrax) can be mounted on each side of the chassis 17, 61 to give the pod 60 the ability to move sideways, rotate 360 degrees, and provide enhanced maneuverability for navigating tight hallways. In a preferred embodiment of the present invention, chassis 17, 61 preferably has four (4) wheels 15, but can have six (6) wheels 15 in other embodiments. In one embodiment, the wheels 15 can be omnidirectional, as seen in FIG. 13. In another embodiment, the wheels 15 can roll forward and backward, as seen in FIGS. 6-9. Preferably, the wheels 15 are driven by individual electric in-hub motors 66. In a preferred embodiment of the present invention, each wheel 58 preferably has a diameter of about eight to twelve inches (20 to 30 cm), more preferably with a diameter of about nine to ten inches (23 to 25 cm), and most preferably with a diameter of about ten to twelve inches (25 to 30 cm).

The user control interface or control panel 68 preferably manages all systems of the chassis 17, 61 from a side or outside of the pod 60. Preferably, a mobile compressed air system 50 on chassis 17, 61 can provide pressurization capability when the pod 60 and chassis 17, 61 is mobile. Preferably, auxiliary air/oxygen tanks 52 on chassis 17, 61 can provide backup oxygen for the chamber/patient. In a preferred embodiment of the present invention, the chassis 17, 61 preferably has 1-2 auxiliary air tanks 52, more preferably 2-3 auxiliary air tanks 52, and most preferably, 3 auxiliary air tanks 52. Preferably, electrical inverters 54 transmit power from the batteries 56 to the pod 60 systems and drive motors 66. In a preferred embodiment of the present invention, the chassis 17, 61 preferably has 2 electrical inverters 54, more preferably 3 electrical inverters 54, and most preferably, 4 electrical inverters 54.

FIG. 14 shows an exploded view of the pod 60 as it connects or disconnects from the chassis 17, showing connections 82, such as bolts, that can securely attach pod 60 to chassis 17.

The present invention also includes a method of using pod 60 with the vehicle cab 64 and loading dock 62 to transport and treat a patient 70. The method of the present invention including bringing the patient 70 to depth at a certain pace, maintaining the hyperbaric pressure at a constant, as well as the ability to bring the patient 70 back to normal atmosphere during the entire process. This method is depicted in FIGS. 15 through 20.

Figure 15:
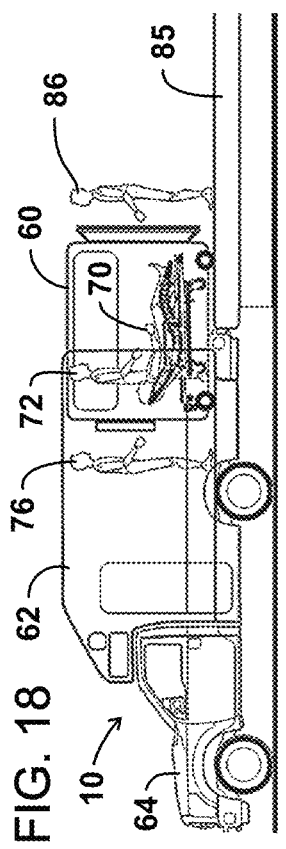
FIGS. 15-20 are sequential images showing a preferred method of the present invention and illustrating loading and treating a patient.

FIG. 15 shows the vehicle 10 as it arrives at an accident location or emergency scene. Preferably paramedics 72, 74 stabilize the patient 70 and load the patient 70 onto a stretcher 46. The patient 70 is brought over to vehicle 10 with loading dock 62 and connected pod 60.

Figure 16:
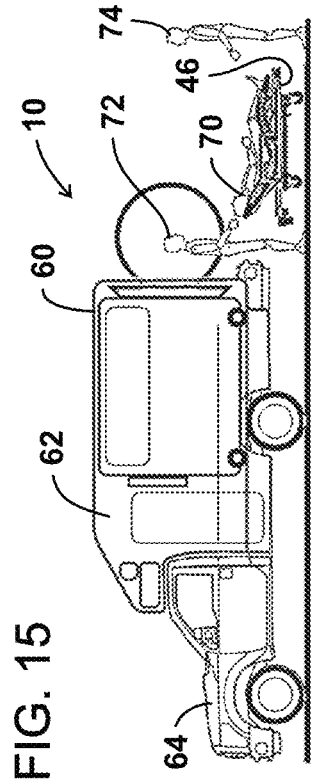

FIG. 16 shows the next steps as paramedics 72, 74 load the patient 70 and stretcher 46 aboard the pod 60 through hatch/door 59 preferably located at the rear of vehicle 10.

Figure 17:
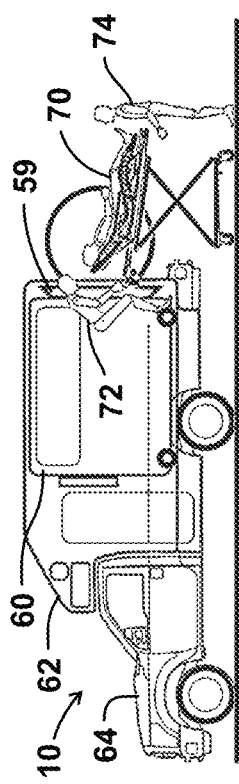

FIG. 17 shows the mobile treatment steps while in route to a hospital or other specialized facility 84. Hatch/door 59 is secured and locked. In a preferred embodiment of the present invention, the hatch/door 59 can be an airtight opening with door, rubber seal and latch handle which preferably locks in a manner similar to that of a door on a commercial airplane. One or more paramedics 72, 74 are preferably in the interior 13 of pod 60 with patient 70, administering medical treatment while the vehicle 10 transports patient 70 to the hospital or other specialized facility 84. Another paramedic 76 is preferably in the technician chamber 12 of loading dock 62, assisting and monitoring the hyperbaric treatment. Preferably, the hyperbaric control technician 76 located in loading dock 62 cabin 12 can begin the mechanical compression process and defibrillation's if necessary while concurrently, the paramedics 72, 74 preferably continue administering trauma treatment and HBO treatment inside the pod 60. The decompression process preferably increases the pressure of the interior 13 of the pod 60 from a baseline measure of 1 atmosphere depth (101 kPa), to about 2, 3, or 4 depths of atmosphere levels (203, 304, 405 kPa). Oxygen is then administered to the patient 70 via a breathing apparatus or in extreme cases via the common atmosphere.

Figure 18:
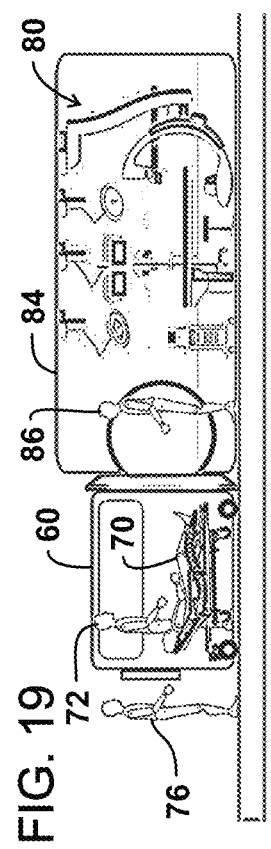

FIG. 18 shows the vehicle 10 and pod 60 upon arrival to the hospital facility 84. Preferably, the vehicle 10 docks in the hospital's loading bay 85. The pod 60 is then disconnected from the umbilical controls/connections 35 that preferably connect pod 60 to loading dock 62. Pod 60, holding patient 70 and paramedic(s) 72, 74 are then unloaded from the vehicle 10 loading dock 62, preferably under the pod 60 own power and support systems. Preferably, pressure is maintained throughout this process of disconnecting pod 60 from loading dock 62 and vehicle 10.

Figure 19:
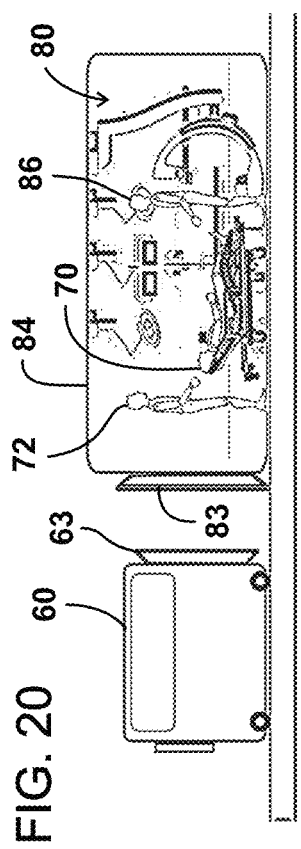

FIG. 19 shows the pod 60 as it reaches a full size hyperbaric system room/chamber 80 of a hospital or other specialized facility 84, such as a multiplace, which has preferably been prepared beforehand to match the pressure level inside the pod 60. Paramedic 76 assists with driving or transporting pod preferably on its own power and support systems to hyperbaric system room/chamber 80.

Pod 60 preferably has hatch connection/fitting 63 which docks/connects to the hatch connection/fitting 83 of a hyperbaric system room/chamber 80, as seen in FIGS. 19, 24-27. Connection/fitting 63 is preferably joined and secured to the corresponding hatch connection/fitting 83 of hyperbaric system room/chamber 80, preferably creating an airtight sealed connection 90 between the door 59 of pod 60 and the door 87 of hyperbaric system room/chamber 80. Sealed connection 90 preferably keeps the pressure between pod 60 and hyperbaric system room/chamber 80 at the same pressure level and unchanged during transfer of patient 70 from pod 60 into hyperbaric system room/chamber 80.

There is no halt or change in the HBO treatment inside the pod 60 during transfer of the patient into room/chamber 80. Door 59 of pod 60 and door 87 of the hyperbaric system room/chamber 80 preferably open inwards to keep the sealed connection 90 intact. Pod 60 mates with the room/chamber 80, preferably by a clamp device 63 (such as a posterior mechanical clamp). A lip (preferably of aluminum alloy) around the exterior of the hatch/fitting 83 can seal and function as an airlock between pod 60 and room/chamber 80. The pressure of the pod 60 and the room/chamber 80 remain constant for the patient 70 during the transfer, and there is no disruption of the treatment pressure to the patient 70.

Once the sealed connection 90 between pod 60 and hyperbaric system room/chamber 80 is completed, patient stretcher 46 is preferably unloaded from pod 60 into room/chamber 80 by the paramedics 72, 86. In a preferred embodiment of the present invention, hatch 63 of pod 60 preferably has a diameter of about two to three feet (61 to 91 cm), more preferably with a diameter of about three to four feet (91 to 122 cm), and most preferably with a diameter of about three feet (91 cm).

Figure 20:
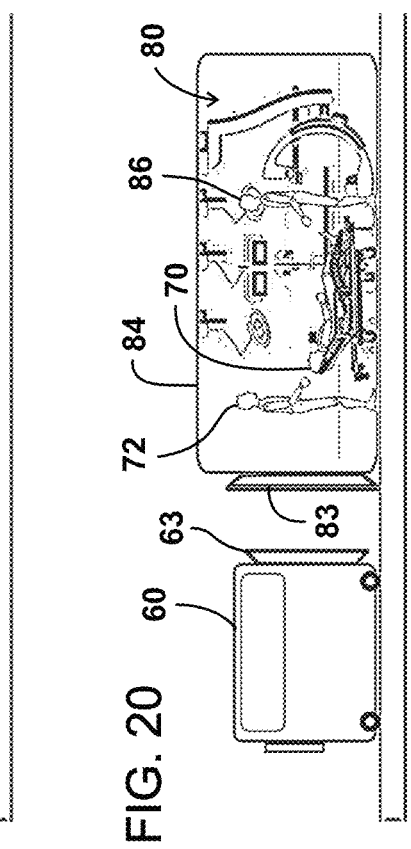

FIG. 20 shows the final step where door 59 of pod 60 and door 87 of room/chamber 80 are secured and fittings 63, 83 are disconnected. Pod 60 is then preferably released from the hyperbaric system room/chamber 80. The pod 60 is now free to return to duty on a separate mission. Once the pod 60 detaches, the pressure is preferably being naturally relieved and returned to normal atmosphere levels.

In various alternate embodiments of the present invention, the pod 60 can be used with multiple vehicle types. The modular, self-sufficient design of the pod 60 allows for infinite applications aboard specially equipped aircraft, sea vessels, military vehicles, or the like.

Figure 21:
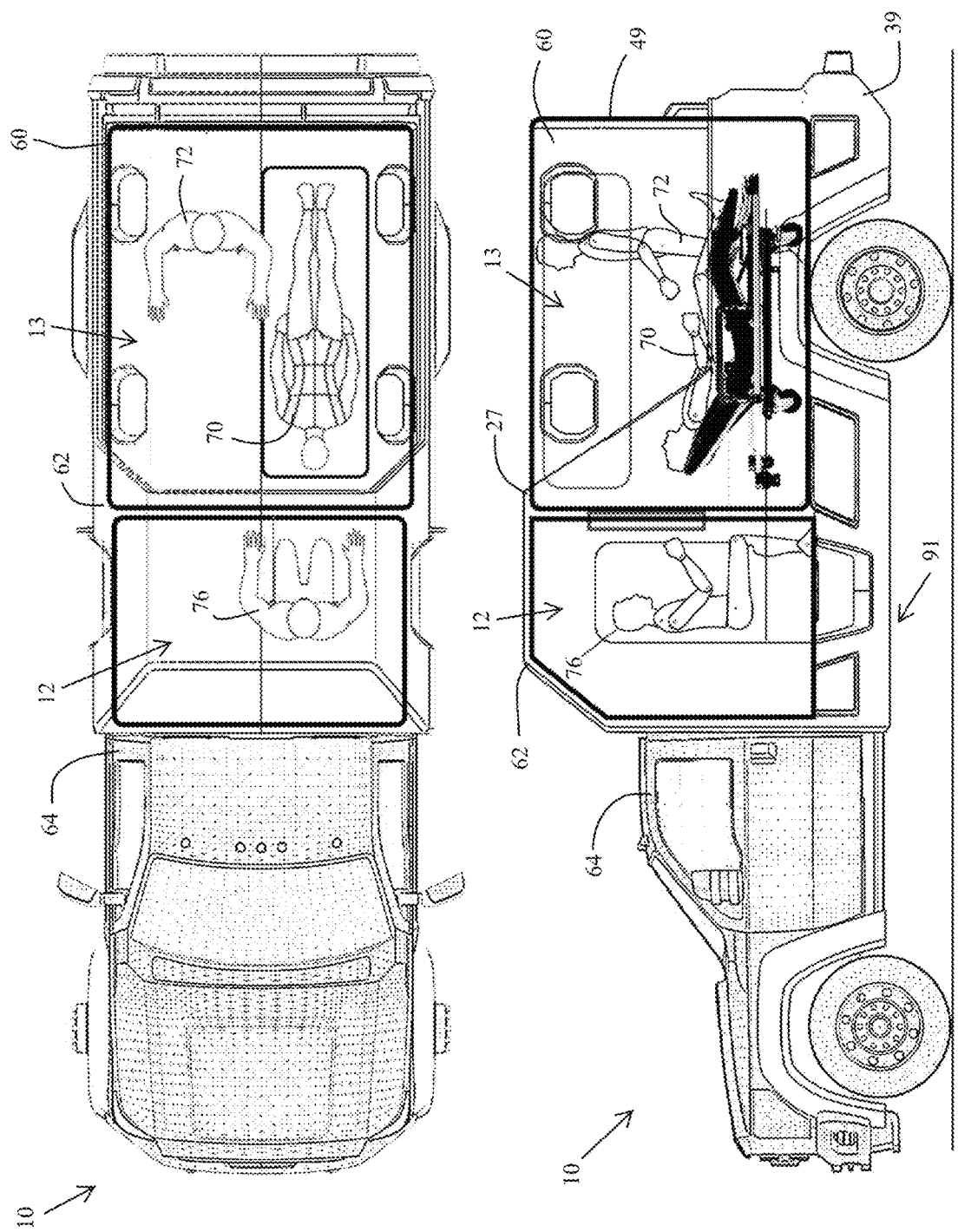
FIG. 21 show partially transparent side and top views of a preferred embodiment of the present invention.

FIG. 21 shows partially transparent side and top views of pod 60 connected to docking system 62 of a vehicle 10. Technician 76 can be in cabin 12 of docking system 62, wherein the technician 76 is facing the pod 60. Technician 76 can control the hyperbaric systems of pod 60 from cabin 12 while a paramedic 72 can provide emergency treatment to patient 70. Both of which treatments (hyperbaric and medical) can be provided on vehicle 10 while vehicle 10 is being driven to a desired location, such as a hospital or other hyperbaric chamber 84.

FIG. 23 is a partial view of the interior cabin 12 of loading dock 62, showing pod 60 in place on loading dock 62 secured in opening/partition 27 of loading dock 62. Pod connections/umbilicals 33, for example air hoses 32, power 78, communication 28, can be connected to the corresponding hook up/connections 35 in loading dock 62.

Figure 24:
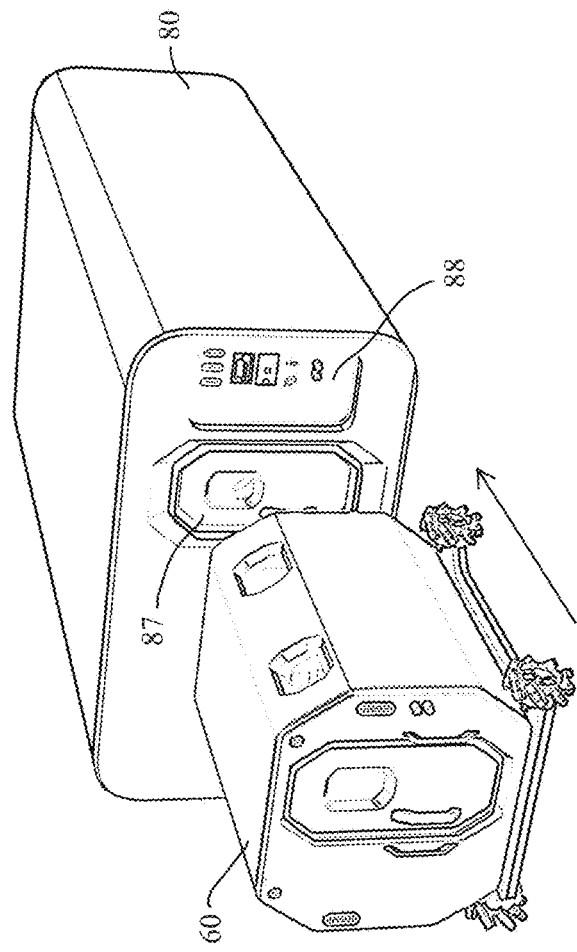
FIG. 24 is a partial perspective view of a preferred embodiment and method of the present invention.
Figure 25:
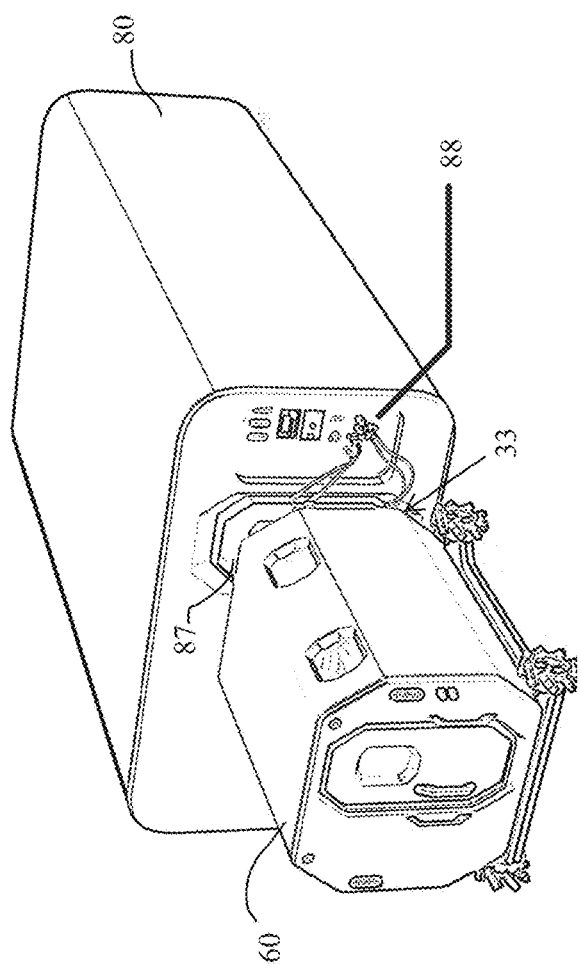
FIG. 25 is a partial perspective view of a preferred embodiment and method of the present invention.

FIGS. 22, 24 and 25 show a preferred embodiment of a method of the present invention. Vehicle 10 with loading dock 62 includes conveyor tracking system 67 on surface/area 65 of bed 39 and preferably located in the rear of vehicle 64. Pod 60 can be secured to loading dock 62 via locking teeth 69 on conveyor tracking system 67, as seen in FIGS. 22, 23. Pod 60 is unloaded off of dock 62 via the tracking system 67 and loaded on to chassis 17, 61. Chassis 17, 61 can include a scissor lift 77 that can raise and lower the upper portion 25 of chassis 17, 61. Scissor lift 77 can raise upper portion 25 to a desired height in line with the height of surface 65 of loading dock 62. Pod 60 can be moved off surface 65 of loading dock 62 and onto the upper surface 35 of chassis 17, 61. The scissors lift 77 on chassis 17, 61 can then be lowered to about ground level for transportation of the pod 60 to a hyperbaric system room/chamber 80 at a hospital or other specialized facility 84, as seen in FIG. 22.

FIGS. 24 and 25 show pod 60 driving towards a hyperbaric system room/chamber 80 at a hospital or other specialized facility 84. Pod 60 arrives near room/chamber 80, preferably door 59 of pod 60 lines up closely with the door 87 of hyperbaric system room/chamber 80. Pod connections 33 are secured to hyperbaric system room/chamber connections 88.

Figure 27:
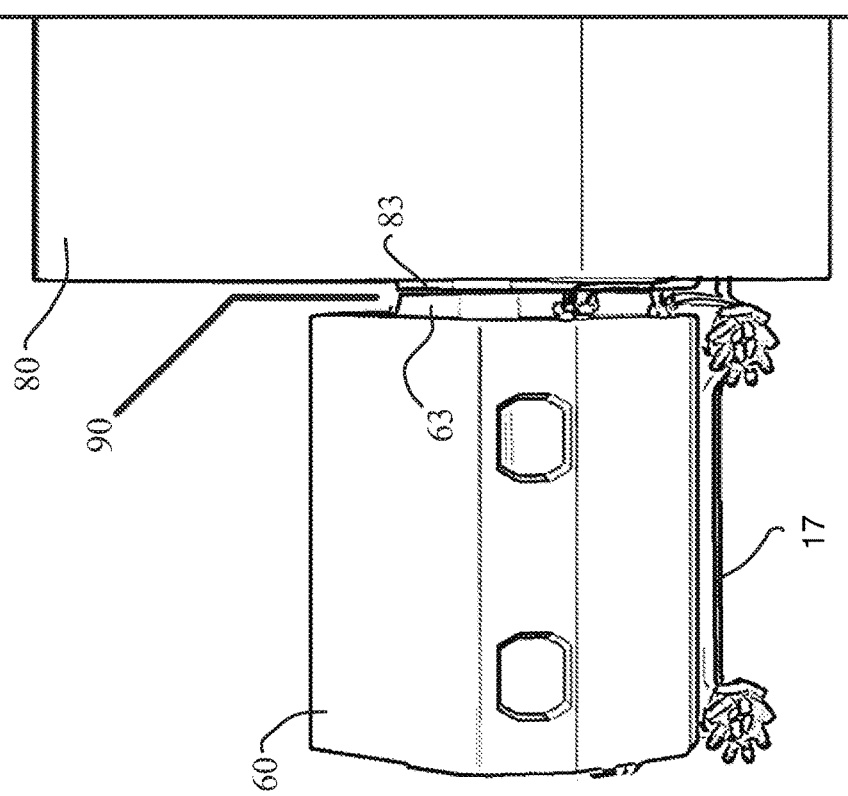
FIG. 27 is a partial perspective side view of a preferred embodiment and method of the present invention.
Figure 26:
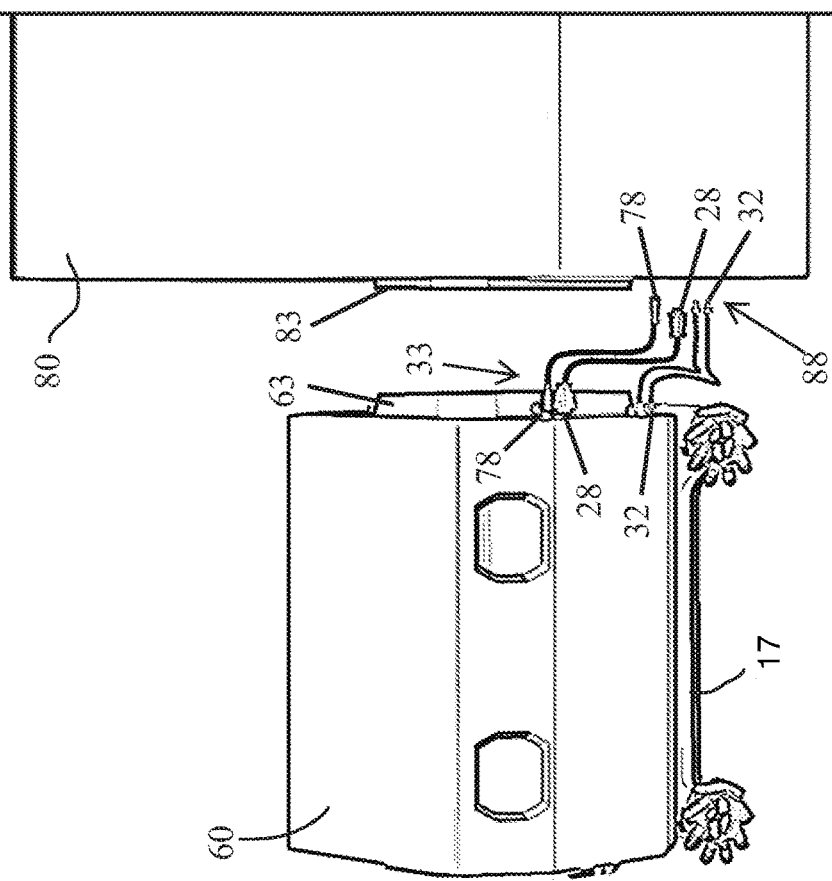
FIG. 26 is a partial perspective side view of a preferred embodiment and method of the present invention.

FIGS. 26 and 27 show connection/fitting 63 preferably joining and secured to the corresponding hatch connection/fitting 83 of hyperbaric system room/chamber 80, preferably creating an airtight sealed connection 90 between the door 59 of pod 60 and the door 87 of hyperbaric system room/chamber 80. Sealed connection 90 preferably keeps the pressure between pod 60 and hyperbaric system room/chamber 80 at the same pressure level and unchanged during transfer of patient 70 from pod 60 into hyperbaric system room/chamber 80.

Preferably, the overall dimensions of the pod 60, preferably in the octagonal form as showed in the figures, with a range of dimensions can be as follows:

Preferably, the smallest size can be about: Width: 63" (1.6 m); Height: 72" (1.8 m); Length: 96" (2.4 m).

Preferably, the largest size can be about: Width: 144" (3.7 m); Height: 96" (2.4 m); Length: 144" (3.7 m). The pod 60 can be larger if it is a multiplace chamber as pictured in drawings.

Most preferably, the pod can be about: Width: 90" (2.3 m); Height: 76" (1.9 m); Length: 96" (2.4 m).

In a preferred embodiment of the present invention, the vehicle 10 has a length of preferably about 14-22 feet (4.3-6.7 m), more preferably about 18-22 feet (5.5-6.7 m), and most preferably, about 18-20 feet (5.5-6.1 m). In a preferred embodiment of the present invention, the vehicle 10 has a width of preferably about 6-7 feet (1.8-2.1 m), more preferably about 7-8 feet (2.1-2.4 m), and most preferably, about 8.5 feet (2.6 m). In a preferred embodiment of the present invention, the vehicle 10 has a height of preferably about 7-8 feet (2.1-2.4 m), more preferably about 8-9 feet (2.4-2.7 m), and most preferably, about 9.3 feet (2.8 m).

In a preferred embodiment of the present invention, the chamber technician cabin 12 has a length of preferably about 4 feet (1.2 m), more preferably about 4-5 feet (1.2-1.5 m), and most preferably, about 6 feet (1.8 m). In a preferred embodiment of the present invention, the chamber technician cabin 12 has a width of preferably about 6-7 feet (1.8-2.1 m), more preferably about 7-8 feet (2.1-2.4 m), and most preferably, about 8 feet (2.4 m).

PARTS LIST

The following is a list of parts and materials suitable for use in the present invention:

| Parts Number | Description |
| --- | --- |
| 10 | vehicle |
| 11 | connection between pod 60 and docking system 62 |
| 12 | chamber technician cabin/station |
| 13 | interior of pod 60 |
| 14 | hyperbaric system control |
| 15 | wheel |
| 16 | battery system/backup battery/triple battery system |
| 17 | chassis |
| 18 | backup generator |
| 19 | port hole window |
| 20 | oxygen tanks |
| 21 | auxiliaries |
| 22 | main air compressors |
| 23 | storage/access compartments |
| 24 | reserve air compressors |
| 25 | chassis 17, 61 upper portion/surface |
| 26 | air compression tank reservoir |
| 27 | opening area/partition |

-continued

| Parts Number | Description |
|---|---|
| 28 | communication/data ports |
| 29 | technician chair in cabin 12 |
| 31 | power line ports (not shown) |
| 32 | oxygen/air pressure/hydraulic hose system hook up |
| 33 | umbilical controls connections/hook ups of pod 60 |
| 34 | load/unload tailgate |
| 35 | umbilical controls connections/hook ups of loading dock 62 |
| 36 | overhead supply storage |
| 37 | conveyor track system of chassis 17, 61 |
| 38 | patient monitoring |
| 39 | bed of vehicle |
| 40 | system communication portal |
| 41 | handle |
| 42 | code cart with medical supplies |
| 43 | handle |
| 44 | paramedic seating station |
| 45 | pod bottom |
| 46 | patient stretcher/support |
| 47 | pod front wall/connecting end |
| 48 | adjustable stretcher armature |
| 49 | pod rear wall |
| 50 | compressed air mobile tank |
| 51 | pod top |
| 52 | auxiliary oxygen tank |
| 53 | pod side wall |
| 54 | electrical inverters |
| 55 | pod side wall |
| 56 | lithium battery cells only on outside of hyperbaric chamber compartment |
| 57 | window |
| 58 | wheel |
| 59 | pod main hatch/door |
| 60 | pod |
| 61 | chassis |
| 62 | loading dock/docking system |
| 63 | pod hatch connection/fitting |
| 64 | cab/cabin |
| 65 | flat surface/area of loading deck 62 |
| 66 | in-hub drive motors |
| 67 | conveyor track system |
| 68 | user control interface/control panel |
| 69 | locking teeth |
| 70 | patient |
| 71 | window |
| 72 | paramedic |
| 73 | door |
| 74 | paramedic |
| 75 | window |
| 76 | hyperbaric control technician |
| 77 | scissors lift on chassis 17, 61 |
| 78 | electrical/accessory hook up |
| 80 | multiplace hyperbaric system room/chamber |
| 81 | pod 60 subframe chassis |
| 82 | connection/bolted connection |
| 83 | main hatch connection/fitting of a multiplace hyperbaric system room/chamber 80 |
| 84 | hospital or other specialized facility |
| 85 | docking/loading bay |
| 86 | paramedic |
| 87 | door to hyperbaric system room/chamber 80 |
| 88 | hyperbaric system room/chamber 80 connections/hook ups |
| 90 | mated/sealed connection of fittings 63, 83 |
| 91 | vehicle chassis |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A mobile hyperbaric apparatus, comprising:
a) a vehicle having a driver's cab with a driver's seat for a driver and a vehicle chassis including a rear bed and a docking station, said docking station having a control cabin and a partition comprising a right side panel and a left side panel, wherein the right side panel and left side panel form a partition opening that extends upwardly from the rear bed at a position next to and behind the control cabin;
b) a pod that is removably attachable to the vehicle chassis behind said partition opening, said pod being separable from both said driver's cab and said control cabin;
c) the pod having an interior, a top wall, left and right side walls, a front wall, a rear wall, and a bottom wall that is sized and shaped to occupy and rest upon the rear bed, wherein the partition is configured to receive a portion of the pod, and when the pod is attached to the chassis, the right side panel of the partition is configured to cover a portion of the right side wall of the pod, and the left side panel of the partition is configured to cover a portion of the left side wall of the pod;
d) wherein the control cabin having ambient pressure and said control cabin located in between the partition opening and the driver's cab, behind the driver's seat;
e) support systems on said vehicle for maintaining the desired pressure within said pod interior that is not ambient pressure; and
f) wherein the control cabin has a control station for increasing the pressure in the pod to the desired pressure, while the driver is enabled to simultaneously transport the vehicle and the pod to a facility having a hospital hyperbaric system chamber.

2. The mobile hyperbaric apparatus of claim 1, further comprising a movable pod chassis that enables the pod to be transported independently of said vehicle chassis, said pod chassis having a control panel to manage the support systems for maintaining the desired pressure within said pod interior that is not ambient pressure, while simultaneously transporting the pod to the facility having the hospital hyperbaric system chamber.

3. The mobile hyperbaric apparatus of claim 2, wherein the pod chassis is equipped with the control panel that allows a user outside the pod to maintain the desired pressure within said pod interior when detached from the vehicle.

4. The mobile hyperbaric apparatus of claim 1, wherein the pod is sized and shaped to hold a patient and one or more paramedics.

5. The mobile hyperbaric apparatus of claim 1, further comprising a hatch fitting on the pod rear wall that mates to a corresponding hatch fitting at the hospital hyperbaric system chamber.

6. The mobile hyperbaric apparatus of claim 1 wherein the pod slides horizontally off the vehicle chassis during removal.

7. The mobile hyperbaric apparatus of claim 1, wherein the desired pressure in the pod is between about 2-4 atmospheres of pressure (203-405 kPa).

8. The mobile hyperbaric apparatus of claim 1, wherein the desired pressure in the pod is about three times higher than ambient air pressure.

9. A mobile hyperbaric apparatus, comprising:
a) a vehicle having a front cab with a driver's seat for a driver and a rear section, said rear section including a partition comprising a right side panel and a left side panel;
b) a control station behind said driver's seat having ambient pressure and positioned in between the partition and the front cab, said control station sized and shaped to hold a control station operator;

c) a removable pod that is removable from both said front cab and said control station and removably attachable to the vehicle rear section behind said control station, the pod having an interior, a top wall, left and right side walls, a front wall, a rear wall, a bottom wall, and one or more pod doors, wherein when the pod is attached to the chassis, the partition has a portion that extends at least partially over said pod top wall and the right side panel of the partition is configured to cover a portion of the right side wall of the pod, and the left side panel of the partition is configured to cover a portion of the left side wall of the pod;

d) one or more support systems on said vehicle and controllable by the control station operator for maintaining a desired pressure within said pod interior that is not ambient pressure; and e) wherein the control station increases pressure in the pod to the desired pressure, while the vehicle and the pod are simultaneously transported to a facility having a hospital hyperbaric system chamber.

10. The mobile hyperbaric apparatus of claim 9, wherein the pod is sized and shaped to hold a patient and one or more paramedics.

11. The mobile hyperbaric apparatus of claim 9, wherein the one or more support systems include one or more: main air compressor, auxiliary air compressors, oxygen tank, a compressed air reservoir tank, a backup power generator, and a communication system.

12. The mobile hyperbaric apparatus of claim 9, further comprising a fitting on the one or more pod doors that enable formation of an air-tight seal with a barometric chamber of a separate medical facility.

13. The mobile hyperbaric apparatus of claim 9, wherein the pod slides horizontally off the rear section during removal.

14. The mobile hyperbaric apparatus of claim 9, wherein the desired pressure in the pod is between about 2-4 atmospheres of pressure (203-405 kPa).

15. A method of administering hyperbaric oxygen medical treatment to a patient with a mobile treatment unit, comprising the steps of:

a) providing a mobile hyperbaric vehicle having a front cab, with a driver's seat that enables support for a driver, a vehicle chassis including a rear bed and a docking station having a partition;

b) a control station behind said driver's seat having ambient pressure and positioned in between the partition and the front cab;

c) said partition comprising a right side panel and a left side panel, wherein the right side panel left side panel forming an opening that extends upwardly from the rear bed behind at a position next to the control station;

d) transporting the mobile hyperbaric vehicle to a location of a patient needing emergency medical treatment;

e) placing the patient in a pod having a top wall, left and right side walls, a front wall, a rear wall, and a bottom wall that is sized and shaped to occupy and rest upon the rear bed, wherein the pod is removably connected to said mobile hyperbaric vehicle next to and behind said partition opening, wherein the partition is configured to receive a portion of the pod, and when the pod is attached to the chassis, the right side panel of the partition is configured to cover a portion of the right side wall of the pod, and the left side panel of the partition is configured to cover a portion of the left side wall of the pod;

f) treating the patient in the pod via the control station by increasing pressure in the pod to a desired pressure that is not ambient pressure, while simultaneously transporting the vehicle and pod with the patient to a facility having a hospital hyperbaric system chamber;

g) detaching the pod from the docking station, the front cab and the control station;

h) transporting the pod to the hospital hyperbaric system chamber on a pod chassis;

i) connecting the pod to the hospital hyperbaric system chamber such that the desired pressure in the pod and the hospital hyperbaric system chamber remain constant for the patient;

j) transporting the patient from the pod to the hospital hyperbaric system chamber without disrupting the desired pressure for the patient; and k) disconnecting the pod from the hospital hyperbaric system chamber without disrupting the desired pressure for the patient.

16. The method of claim 15, wherein the pod is sized and shaped to hold the patient and one or more paramedics.

17. The method of claim 15, wherein the control station is sized and shaped to hold a paramedic or technician.

18. The method of claim 15, wherein the pod rear wall includes a hatch fitting that connects to a corresponding hatch fitting on the hospital hyperbaric system chamber and thereby creating an airtight seal between the pod and the hospital hyperbaric system chamber.

19. The method of claim 15, wherein the pod slides horizontally off the vehicle chassis during removal.

20. The method of claim 15, wherein the pod chassis is equipped with a control panel that allows a user outside the pod to maintain the desired pressure within said pod interior when detached from the vehicle.

* * * * *